United States Patent
Hashimoto et al.

(10) Patent No.: US 7,638,726 B2
(45) Date of Patent: Dec. 29, 2009

(54) WIRE ELECTRIC DISCHARGE MACHINING APPARATUS AND WIRE ELECTRIC DISCHARGE MACHINING METHOD

(75) Inventors: Takashi Hashimoto, Tokyo (JP); Tatsushi Satou, Tokyo (JP); Akihiko Iwata, Tokyo (JP); Yoshikazu Ukai, Tokyo (JP); Yasuo Onodera, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 289 days.

(21) Appl. No.: 11/665,683

(22) PCT Filed: Apr. 5, 2006

(86) PCT No.: PCT/JP2006/307249

§ 371 (c)(1),
(2), (4) Date: Apr. 17, 2007

(87) PCT Pub. No.: WO2007/032114

PCT Pub. Date: Mar. 22, 2007

(65) Prior Publication Data

US 2008/0110865 A1    May 15, 2008

(30) Foreign Application Priority Data

Sep. 15, 2005   (JP)   ............... 2005-269138

(51) Int. Cl.
*B23H 7/02*   (2006.01)
*B23H 7/20*   (2006.01)
(52) U.S. Cl. ................ 219/69.12; 219/69.17; 700/162
(58) Field of Classification Search .............. 219/69.12, 219/69.13, 69.18, 69.17; 700/162
See application file for complete search history.

(56) References Cited

U.S. PATENT DOCUMENTS 4,963,711 A * 10/1990 Obara .................... 219/69.12
5,306,889 A *  4/1994 Kaneko et al. .......... 219/69.12
5,500,500 A *  3/1996 Mohri et al. ............. 219/69.17

FOREIGN PATENT DOCUMENTS

| EP | 0 178 543 A2 | 4/1986 |
| EP | 0 178 544 A2 | 4/1986 |
| JP | 61-95825 A | 5/1986 |
| JP | 61-95826 A | 5/1986 |
| JP | 63-288627 A | 11/1988 |

(Continued)

OTHER PUBLICATIONS

"Discharge Machining Technology" The Nikkan Kogyo Shinbun, p. 25.

(Continued)

*Primary Examiner*—Geoffrey S Evans
(74) *Attorney, Agent, or Firm*—Sughrue Mion, PLLC

(57) ABSTRACT

A discharge-generation control unit applies at least a preliminary-discharge voltage pulse and a main-discharge voltage pulse between a wire electrode and a work. A discharge-position determining unit determines a discharge position from results of measurement by a plurality of current measuring units. A machining-energy adjusting unit adjusts machining energy generated by the main-discharge voltage pulse based on a discharge position determined before applying the main-discharge voltage pulse, and reflects a result of the adjustment on the generation of an electric discharge by feeding the result to the discharge-generation control unit.

14 Claims, 16 Drawing Sheets

FOREIGN PATENT DOCUMENTS

| | | |
|---|---|---|
| JP | 3-86427 A | 4/1991 |
| JP | 2879687 A | 1/1999 |
| JP | 3085040 A | 7/2000 |
| WO | WO 2007/032114 A1 | 3/2007 |

OTHER PUBLICATIONS

"Study of Breaking-Wire Prevention Control for Wire Electric Discharge Machining (Third Report)" Japan Society of Electrical-Machining Engineers Magazine.

* cited by examiner

FIG.10
(a) EXAMPLE OF VOLTAGE AND CURRENT WAVEFORMS UNDER ROUGH MACHINING CONDITIONS
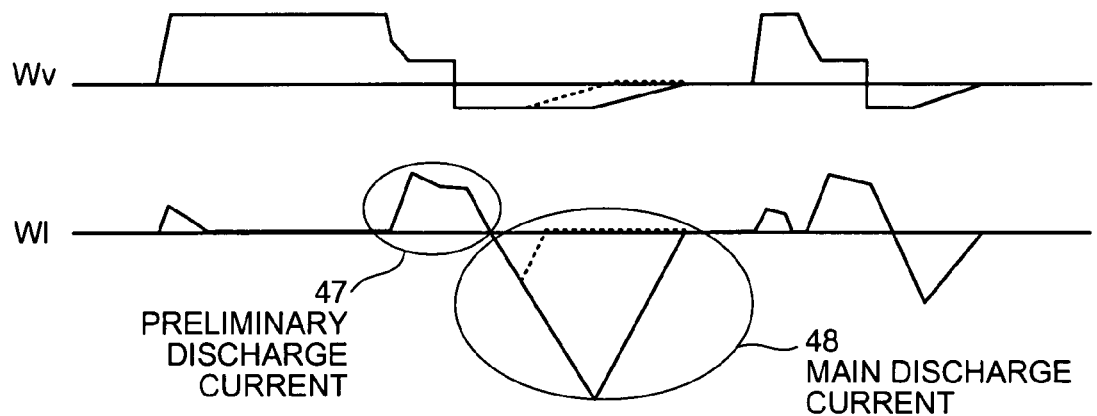
47 PRELIMINARY DISCHARGE CURRENT
48 MAIN DISCHARGE CURRENT
(b) EXAMPLE OF VOLTAGE AND CURRENT WAVEFORMS UNDER FINISH MACHINING (FINE MACHINING) CONDITIONS
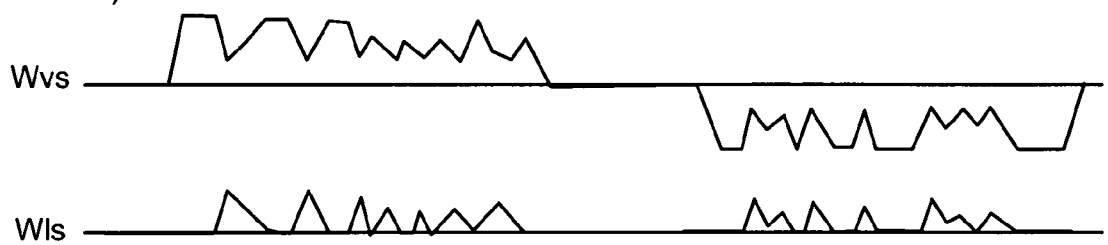

FIG.13
(a) EXPERIMENT DATA
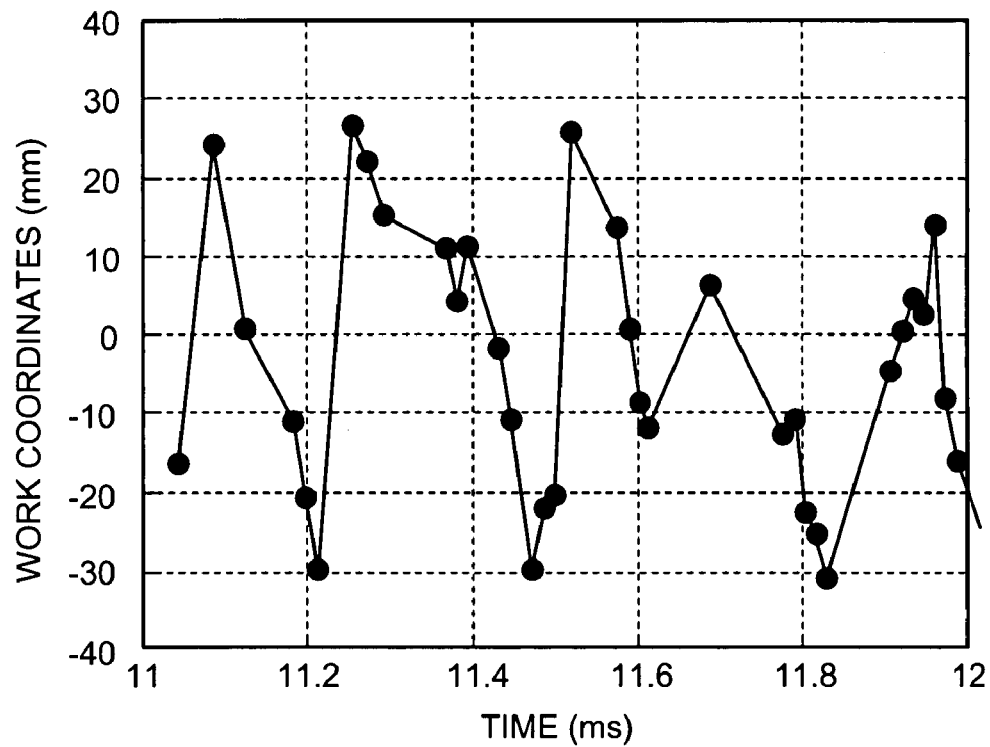
(b) MEASUREMENT DATA
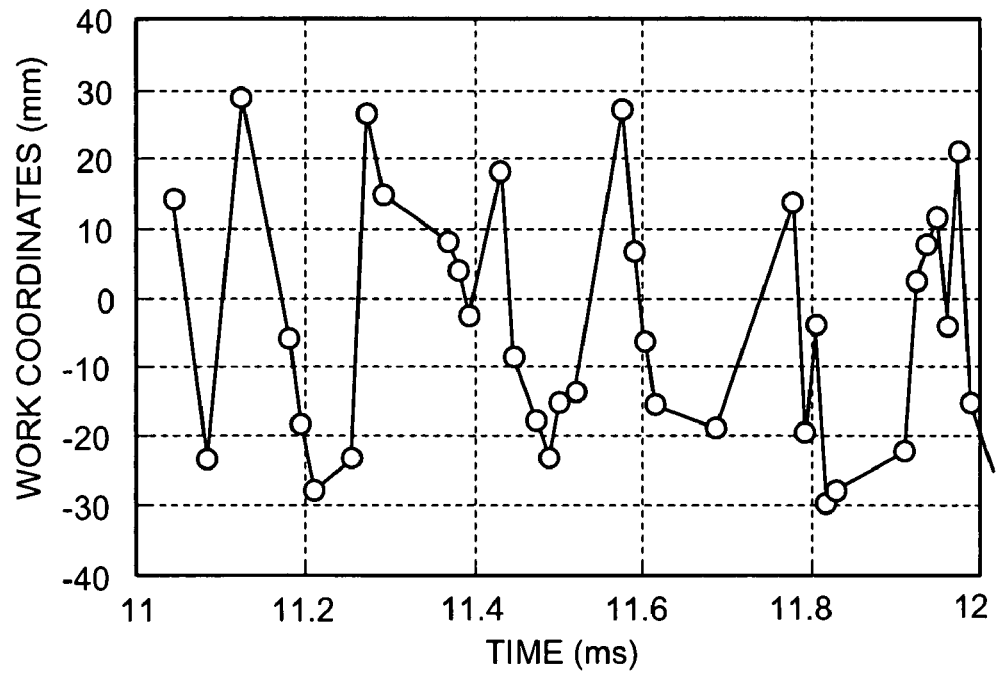

WIRE ELECTRIC DISCHARGE MACHINING APPARATUS AND WIRE ELECTRIC DISCHARGE MACHINING METHOD

TECHNICAL FIELD

The present invention relates to a wire electric discharge machining apparatus and a wire electric discharge machining method.

BACKGROUND ART

A wire electric discharge machining apparatus is an apparatus that generates a pulse-like electric discharge between a wire serving as an electrode and a work, which are arranged to be opposed to each other in the water, and machines the work into a desired shape using thermal energy of the electric discharge. In the wire electric discharge machining apparatus, the wire is subjected to a reaction force in a direction opposite to a discharge direction after the electric discharge ends. To eliminate discharge machining scrap, in general, high-pressure machining fluid is spayed from positions above and below a position where the wire is opposed to the work to the opposed position. The wire is vibrated by the discharge reaction force, the spray of the machining fluid, and the like. As a result, straightness accuracy of the work is easily deteriorated.

To realize the straightness accuracy of the work, parameters such as machining energy, machining speed, wire tension, and machining fluid pressure are optimally selected for first cut to fourth or fifth cut and the parameters are merged into a condition table for each work material, board thickness, and wire type. However, considerable time and labor are required for creation of the condition table.

In the wire electric discharge machining apparatus, a method of directly connecting the work to one electrode of a machining power supply and connecting the traveling wire to the other electrode of the machining power supply via feeding points, which are in sliding contact with the wire, is adopted for supplying power between the electrodes. In general, the feeding points are provided in two places above and below the position where the wire is opposed to the work. Thus, discharge positions are detected using this structure. In the wire, flow paths of discharge currents are present in parallel on an upper side and a lower side thereof. Since the wire is a resistor and resistance thereof is proportional to a wire length, it is possible to determine the discharge positions according to a flow-dividing ratio of a parallel circuit. There are various methods of calculating the discharge positions such as a method of using a differential value, a method of observing a supply voltage, and a method of calculating the differential value and the supply voltage. For example, a method of detecting a current difference caused by a difference in a resistance ratio using a current sensor and specifying a position as disclosed in a Patent Document 1 may be considered a general method.

One of causes of breaking of wire in the wire electric discharge machining apparatus is "concentrated discharge" in which electric discharges are concentrated in one place of wire. If the detection of discharge positions makes it possible to determine that electric discharges are concentrated in an identical place of the wire, it is possible to reduce the machining energy to facilitate prevention of breaking of wire. It is also possible to change machining conditions such as wire tension and a machining liquid pressure to prevent the concentrated discharge.

Concerning this point, in the Patent Document 1, a method of changing, when a concentrated discharge is detected, traveling speed of the wire to agitate machining scrap and changing a position of a discharge point according to the change in the traveling speed to solve over-concentration of electric discharges is adopted.

In the Patent Document 1, a discharge state in an extremely short period is monitored in this way. However, as other methods of utilizing the discharge position detection, for example, as disclosed in a Patent Document 2, it is also possible to grasp a state of an entire electric discharge in a relatively long-term range and determine a machining board thickness, a machining shape, and the like.

Conventionally, in automatically machining a work, a machining shape of which changes complicatedly, it is necessary to input a place where a shape of the work changes in a machining program in advance to change machining conditions or set machining conditions with low machining energy for preventing breaking of wire from occurring in an entire machining range. This method is inefficient and low in productivity.

Thus, in the Patent Document 2, in addition to the discharge-position determining means in the Patent Document 1, machining-area recognizing means for recognizing a history of change in a machining shape is provided to recognize, even if the machining shape (a board thickness) changes complicatedly, the change and automatically select optimum machining conditions.

However, although it is possible to measure discharge positions between the wire and the work as described above, it is impossible to induce an electric discharge in an arbitrary position. In other words, the main purpose of the Patent Documents 1 and 2 is to measure discharge positions. It is impossible to positively control electric discharges in the discharge positions measured. To make use of the measured discharge positions for the control, it is necessary to output, after statistically processing a plurality of electric discharges, a calculation result as a control signal.

In short, conventionally, shape machining in general wire electric discharge machining utilizes an X-axis and a Y-axis that define a plane perpendicular to wire. A Z-axis, which is in a traveling direction of the wire, is only set initially depending on a board thickness of a work. It is impossible to perform the shape machining in the Z-axis direction.

In a non-Patent Literature 1, machining characteristics at the time when an electric discharge occurs only once and in a continuous electric discharge are explained. In a non-Patent Literature 2, a relation between a discharge position and a discharge voltage in the case of a large current discharge is reported.

Patent Document 1: Japanese Patent No. 287968
Patent Document 2: Japanese Patent No. 3085040
Non-Patent Literature 1: "Discharge Machining Technology", the Nikkan Kogyo Shimbun, page 25
Non-Patent Literature 2: "Study of Breaking-wire Prevention Control for Wire electric discharge machining (Third Report)" Japan Society of Electrical-Machining Engineers Magazine, vol. 36, No. 81 (2002)

DISCLOSURE OF INVENTION

Problem to be Solved by the Invention

As described above, since the wire electric discharge machining apparatus machines a work using an electric discharge between the wire and the work, a wire shape is transferred to a work shape via a predetermined discharge gap.

Thus, there is a general problem in that straightness accuracy of the work is deteriorated because of distortion of the wire. In particular, under conditions of rough machining performed in the first cut, since machining is performed by inputting large energy, wire tension is increased and a machining fluid pressure is increased to perform the machining. Thus, the wire tends to vibrate and machining accuracy tends to deteriorate. On the contrary, to improve the straightness accuracy, tension has to be increased to prevent the wire from being distorted. In addition, machining energy has to be reduced to prevent discharge reaction from increasing. When these measures are taken, machining speed considerably falls and production efficiency is deteriorated.

To cope with this problem, in the Patent Document 2, it is possible perform machining under the optimum conditions according to shape recognition. However, fluctuation in a shape in a long-term range is only detected. It is impossible to perform machining under conditions taking into account the straightness accuracy. For example, under an identical board thickness condition, the machining conditions do not change any more and straightness cannot be controlled and depends solely on an electric discharge.

As described above, as a characteristic of the wire electric discharge machining apparatus, it is impossible to induce an electric discharge position in an arbitrary place. Thus, like the problem of straightness, shape machining in the Z-axis direction depends on an electric discharge. It is impossible to positively control the shape machining.

Further, in the conventional wire electric discharge machining apparatus, there is a problem in that electric discharges concentrated in an identical place twice in a row cannot be prevented. To cope with this problem, in the Patent Document 1, in detecting a discharge machining position in a short-term range, it is determined whether an electric discharge and another electric charge are continuous. However, a discharge current used for the determination of discharge positions has already been discharged in that position. Thus, for example, the electric discharges concentrated in an identical place twice in a row cannot be prevented by any control means. In the method disclosed in the Patent Document 1, control for detecting electric discharges concentrated twice in a row to reduce energy of a third electric discharge or changing the machining conditions can be performed at most. Therefore, a precondition for machining energy is that breaking of wire does not occur even if electric discharges are concentrated twice in a row. In other words, this is a form having low production efficiency with machining energy reduced.

Moreover, when an application for stacking and machining a plurality of works made of different materials is considered, in the conventional wire electric discharge machining apparatus, it is necessary to adjust machining energy to a material of a work that most easily causes breaking of wire. It is impossible to adjust the machining energy to each of the materials of the works. This is inefficient and deteriorates productivity.

The present invention has been devised in view of the circumstances and it is an object of the present invention to obtain a wire electric discharge machining apparatus and a wire electric discharge machining method that make it possible to improve straightness accuracy of a work, prevent electric discharges from being concentrated twice in a row, and, even when a plurality of works made of different materials are stacked, apply optimum machining conditions to the respective materials to simultaneously machine the works.

Means for Solving Problem

To achiever the above object, a wire electric discharge machining apparatus according to one aspect of the present invention includes a discharge-generation control unit that applies at least a preliminary-discharge voltage pulse and a main-discharge voltage pulse between a wire electrode and a work in this order to generate a pulse-like electric discharge; a current measuring unit that measures a discharge current flowing between the electrodes in a plurality of current-carrying paths; and a discharge-position determining unit that determines, in calculating discharge positions from results of measurement by a plurality of current measuring units, a discharge position at the time of at least second application of the preliminary-discharge voltage pulse. The wire electric discharge machining apparatus includes a unit that adjusts, before the application of the main-discharge voltage pulse, machining energy generated by the main-discharge voltage pulse based on the discharge positions determined.

According to the present invention, it is possible to reduce machining energy for each machining position as required. Thus, it is possible to improve straightness accuracy and positively perform machining of an arbitrary shape in a traveling direction of wire (a Z-axis direction). Even if electric discharges are concentrated twice in a row, it is possible to determine, before applying main discharge currents in the second electric discharge, that the concentrated discharges occur and reduce the machining energy. Thus, it is possible to prevent breaking of wire or increase maximum machining speed until the wire breaks. Moreover, even when a plurality of works made of different materials are stacked, it is possible to determine, according to a discharge position, a material corresponding to the discharge position before application of main discharge currents by setting a correspondence relation between coordinates in the Z-axis direction and the respective materials (the works) in a known state. It is possible to select, based on the determination, optimum machining conditions according to the material, and simultaneously machine the works. Thus, it is possible to improve machining speed.

Effect of the Invention

According to the present invention, it is possible to improve straightness accuracy of a work, prevent electric discharges from being concentrated twice in a row, and, even when a plurality of works made of different materials are stacked, apply optimum machining conditions to the respective materials to simultaneously machine the works. Thus, there is an effect that productivity is improved.

BRIEF DESCRIPTION OF DRAWINGS

FIG. 10 is a diagram of an example of voltage and current waveforms under finish machining conditions compared with voltage and current waveforms under rough machining conditions;

FIG. 13 is a graph of a discharge position obtained from a main-discharge-position determining circuit shown in FIG. 12 and a state at the time when the next discharge position is predicted based on the discharge position;

EXPLANATIONS OF LETTERS OR NUMERALS

Figure 1:
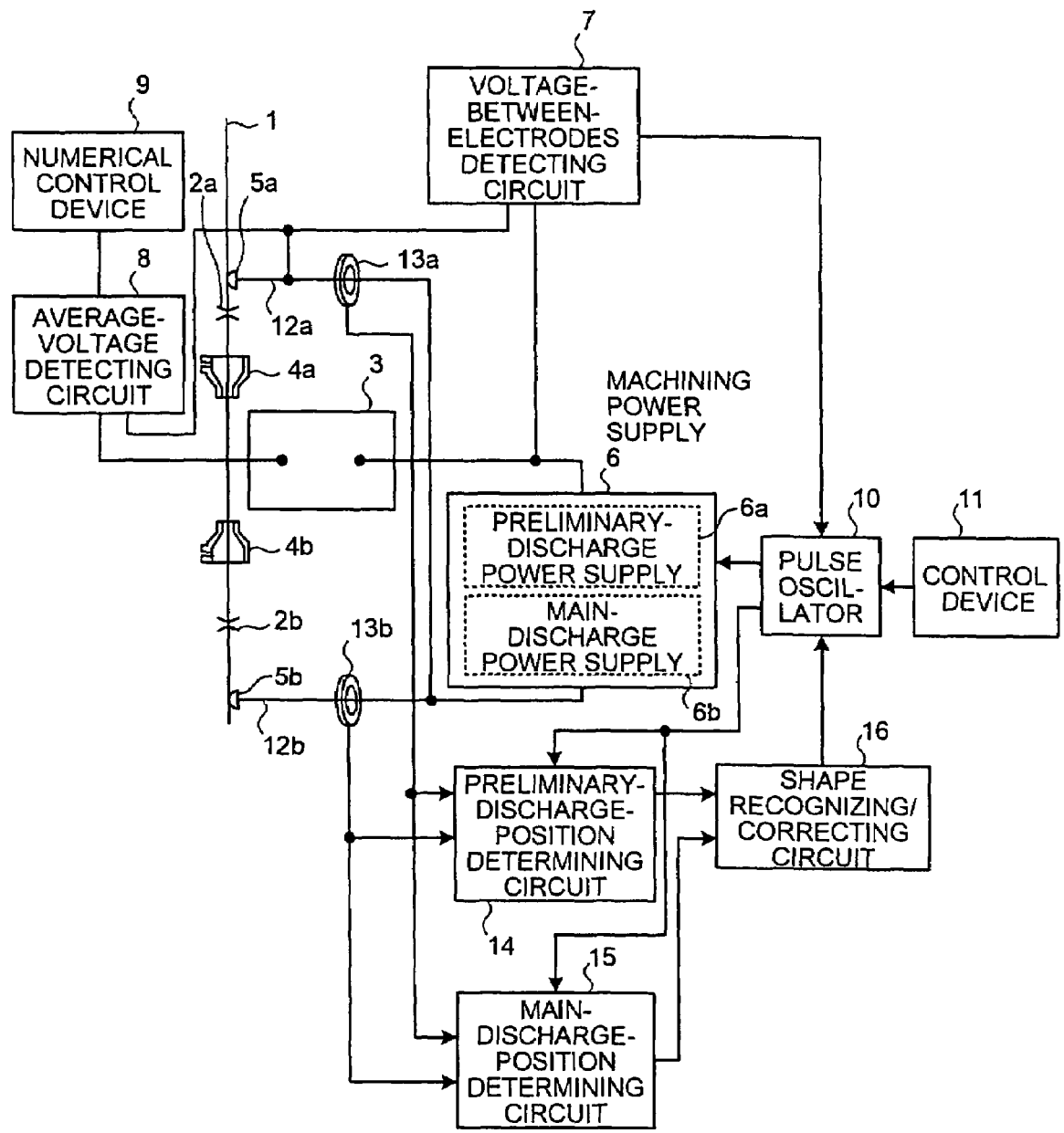
FIG. 1 is a block diagram of a structure of a wire electric discharge machining apparatus according to a first embodiment of the present invention.

1 Wire electrode
2a, 2b Wire guides
3 Work
4a, 4b Machining fluid nozzles
5a, 5b Feeding points
6 Machining power supply
6a Preliminary-discharge power supply
6b Main-discharge power supply
6c, 6d Extended discharge circuits
V6c DC power supply
V6a, V6c DC power supplies
6a-1 to 6a-4, 6c-1 to 6c-4 FETs
R, R1, R2 Current-limiting resistors
SW, SW1, SW2 Bidirectional switches
7 Voltage-between-electrodes detecting circuit
8 Average-voltage detecting circuit
9 Numerical control device
10 Pulse oscillator
11 Control device
12a, 12b Feeders
13a, 13b Current sensors
14 Preliminary-discharge-position determining circuit (Dummy-pulse-position determining circuit)
15 main-discharge-position determining circuit
16 Shape recognizing/correcting circuit
17 Discharge-position predicting circuit
30 Differentiating circuit
31 Mask circuit
32 Voltage-between-electrodes-change detecting circuit
33 Pulse generating circuit

BEST MODE(S) FOR CARRYING OUT THE INVENTION

Exemplary embodiments of a wire electric discharge machining apparatus and a wire electric discharge machining method according to the present invention are explained in detail below with reference to the accompanying drawings.

First Embodiment

FIG. 1 is a block diagram of a structure of a wire electric discharge machining apparatus according to a first embodiment of the present invention. In FIG. 1, reference numeral 1 denotes a wire electrode. The wire electrode 1 is guided by wire guides 2a and 2b, which are arranged at an appropriate interval in a vertical direction, to travel, for example, from an upper position to a lower position. In a traveling path of the wire electrode 1 between the wire guides 2a and 2b, a work 3 is arranged to be opposed to the wire electrode 1 at a predetermined interval. Machining fluid nozzles 4a and 4b are provided in positions close to each other in the vertical direction across a position where the wire electrode 1 is opposed to the work 3. High-pressure machining fluid is sprayed from positions above and below the work 3 to the position where the wire electrode 1 and the work 3 are opposed to each other to eliminate discharge machining scrap.

A feeding point 5a and a feeding point 5b are provided in a position above the wire guide 2a and a position below the wire guide 2b in sliding contact with the wire electrode 1, respectively. One output electrode of a machining power supply 6 is connected to the work 3, one input terminal of a voltage-between-electrodes detecting circuit 7, and one input terminal of an average-voltage detecting circuit 8. The other electrode of the machining power supply 6 is connected to the wire electrode 1 via the feeding points 5a and 5b and is connected to the other input terminal of the voltage-between-electrodes detecting circuit 7 and the other input terminal of the average-voltage detecting circuit 8.

The machining power supply 6 includes a preliminary-discharge power supply 6a and a main-discharge power supply 6b. The preliminary-discharge power supply 6a mainly generates, for the purpose of detection of a state between electrodes of a machining gap (between the electrodes) between the wire electrode 1 and the work 3, a voltage pulse of a relatively low voltage (a preliminary-discharge voltage pulse) for feeding preliminary discharge currents between the electrodes. The main-discharge power supply 6b mainly generates a voltage pulse of a predetermined level and a predetermined pulse width (a main-discharge voltage pulse) for feeding main discharge currents for machining between the electrodes. The machining power supply 6 generates the preliminary-discharge voltage pulse and the main-discharge voltage pulse in this order according to an instruction of a pulse oscillator 10.

The average-voltage detecting circuit 8 detects an average voltage between the electrodes and gives the average voltage to a numerical control device 9. A driving device that determines relative positions of the wire electrode 1 and the work 3 is not shown in the figure. However, the numerical control device 9 calculates a value of an instruction to the driving device based on the average voltage detected by the average-voltage detecting circuit 8.

The voltage-between-electrodes detecting circuit 7 detects voltages at the time of no load and at the time of an electric discharge between the electrodes and gives the voltages to the pulse oscillator 10. A control device 11 gives machining condition parameters decided in advance to the pulse oscillator 10 to set machining electric conditions. The pulse oscillator 10 controls, based on the machining condition parameters from the control device 11, the voltage-between-electrodes detected by the voltage-between-electrodes detecting circuit 7, and an output of a shape recognizing/correcting circuit 16 described later, a switching operation of the machining power supply 6 and controls application of a discharge voltage pulse between the electrodes. In other words, the machining power supply 6 and the pulse oscillator 10 constitute a discharge-generation control unit as a whole. In addition, the pulse oscillator 10 has a function for giving a trigger signal for starting determining operations to a preliminary-discharge-position determining circuit 14 and a main-discharge-position determining circuit 15 described later.

Reference numerals 13a and 13b denote current sensors that constitute a current measuring unit, respectively. One current sensor 13a is provided in a feeder 12a that connects one output electrode of the machining power supply 6 and the feeding point 5a. The other current sensor 13b is provided in a feeder 12b that connects the other output electrode of the machining power supply 6 and the feeding point 5b. The current sensors 13a and 13b are current transformers (CT) or hall elements. The current sensors 13a and 13b detect discharge current flowing between the electrodes, respectively, and give a result of the detection to the preliminary-discharge-position determining circuit 14 and the main-discharge-position determining circuit 15.

A time constant of the current sensors 13a and 13b is preferably small. However, it is possible to calculate a current value in an approximate manner even if the time constant is large. If extended discharge pulse or main-discharge pulse waveforms described later are changed, it is possible to perform measurement at sampling time corresponding to sensors having a large time constant.

The preliminary-discharge-position determining circuit 14 determines discharge positions (preliminary discharge positions) in the wire electrode 1 based on the preliminary discharge currents detected by the current sensors 13a and 13b and outputs a result of the determination to the shape recognizing/correcting circuit 16. The main-discharge-position determining circuit 15 determines discharge positions (main discharge positions) in the wire electrode 1 based on main discharge currents detected by the current sensors 13a and 13b and outputs a result of the determination to the shape recognizing/correcting circuit 16. In other words, the preliminary-discharge-position determining circuit 14 and the main-discharge-position determining circuit 15 constitute a discharge-position determining unit.

The shape recognizing/correcting circuit 16 calculates discharge energy of the discharge positions determined by the preliminary-discharge-position determining circuit 14 and the main-discharge-position determining circuit 15, respectively, prepares the next discharge energy in the respective discharge positions, and gives the next discharge energy to the pulse oscillator 10 as control information. In other words, the shape recognizing/correcting circuit 16 constitutes a machining-energy adjusting unit.

The main-discharge-position determining circuit 15 may not be used. In FIG. 1, only one set of the current sensors 13a and 13b is provided for both the preliminary-discharge-position determination and the main-discharge-position determination. However, current sensors may be provided independently for the preliminary-discharge-position determination and the main-discharge-position determination. The preliminary discharge currents are currents of about several amperes to several tens amperes. The main discharge currents are currents having a maximum peak current exceeding 1000 amperes. If optimum current sensors corresponding to respective measurement ranges are selected, it is possible to improve measurement accuracy. For observation of the preliminary discharge currents, it may be better to use a hall element rather than a CT. This is because, although the CT is a sensor of an alternating current type and it is necessary to pay attention to a frequency characteristic and a peripheral circuit of the CT, it is unnecessary to consider a frequency characteristic of the hall element.

Operations are explained. In FIG. 1, first, the pulse oscillator 10 causes the preliminary-discharge power supply 6a to perform a switching operation and apply a preliminary discharge voltage between the electrodes. The pulse oscillator 10 monitors a voltage-between-electrodes output by the voltage-between-electrodes detecting circuit 7 and measures a no-load time in which the voltage-between-electrodes falls from the applied voltage to a predetermined discharge voltage. The voltage-between-electrodes detecting circuit 7 gives the voltage-between-electrodes detected to the pulse oscillator 10. In addition, the voltage-between-electrodes detecting circuit 7 uses, for example, a comparator, generates discharge detection pulses at timing when the voltage-between-electrodes falls from the applied voltage to the predetermined discharge voltage, and gives the discharge detection pulses to the pulse oscillator 10.

The pulse oscillator 10 determines that an electric discharge is a "normal discharge" when the voltage-between-electrodes detected by the voltage-between-electrodes detecting circuit 7 indicates a level of the preliminary discharge voltage. The pulse oscillator 10 determines that an electric discharge is an "instant discharge" when the discharge detection pulses are input after a short no-load time. The pulse oscillator 10 determines that a "short circuit" has occurred when the voltage-between-electrodes detecting circuit 7 cannot detect a voltage-between-electrodes.

When the discharge detection pulses are input or it is determined that the short circuit has occurred, the pulse oscillator 10 turns off the preliminary-discharge power supply 6a, turns on the main-discharge power supply 6b to apply a main-discharge voltage pulse between the electrodes, and shifts to a discharge machining operation. Operations of the sections related to the first embodiment are specifically explained below with reference to FIG. 2.

Figure 2:
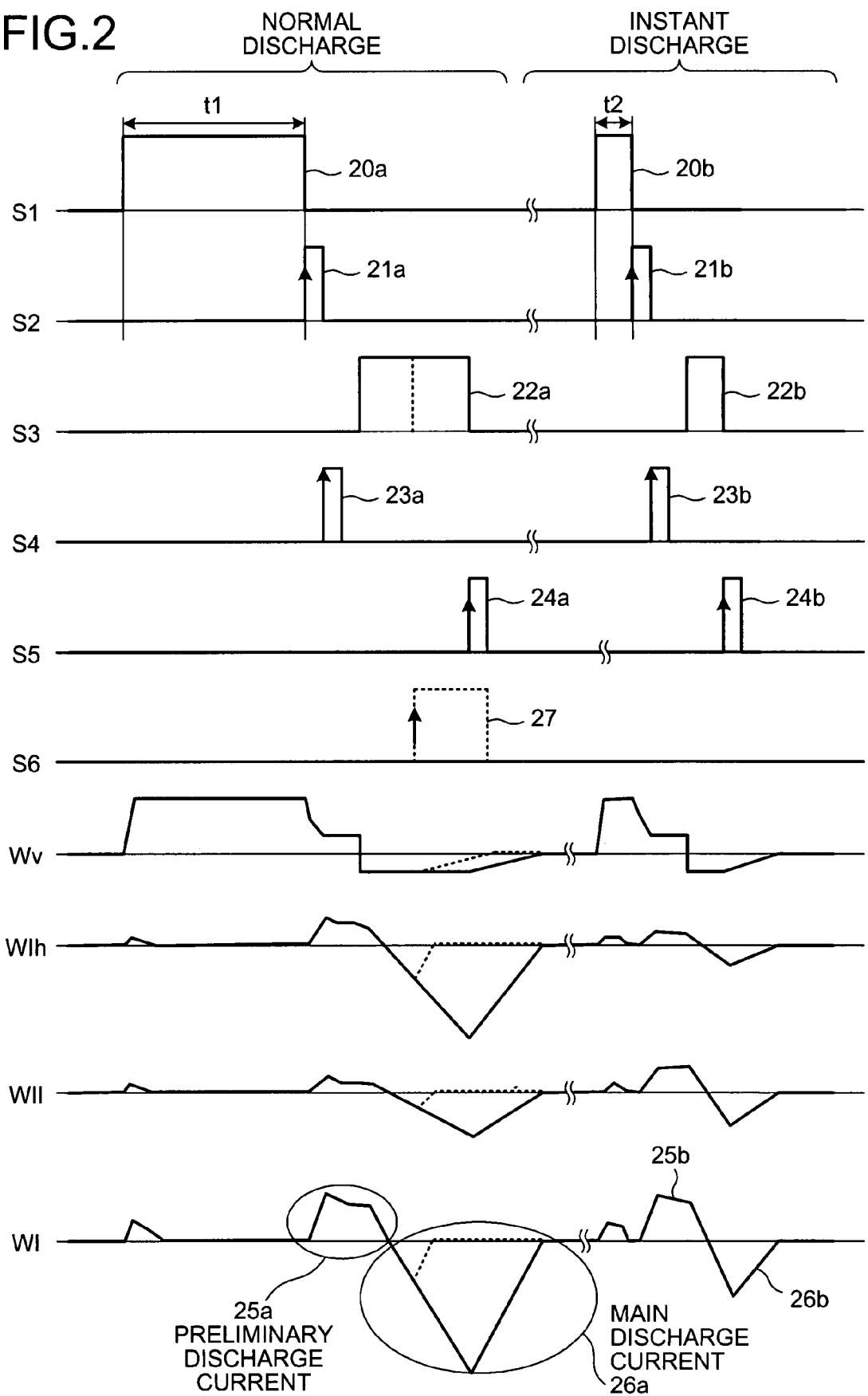
FIG. 2 is a time chart for explaining operations of the wire electric discharge machining apparatus shown in FIG. 1.

FIG. 2 is a time chart for explaining operations of the wire electric discharge machining apparatus shown in FIG. 1. In FIG. 2, waveforms at the time of the normal discharge are shown on the left side and waveforms at the time of an abnormal discharge (the instant discharge) are shown on the right side. In FIG. 2, S1 indicates a waveform of a preliminary-discharge voltage pulse applied between the electrodes. S2 indicates a waveform of a discharge detection pulse output by the voltage-between-electrodes detecting circuit 7. S3 is a waveform of a main-discharge voltage pulse applied between the electrodes. S4 is a waveform of a trigger signal for causing the preliminary-discharge-position determining circuit 14 to start the determination of preliminary discharge positions. S5 indicates a waveform of a trigger signal for causing the main-discharge-position determining circuit 15 to start the determination of main discharge positions. S6 indicates a waveform of a main-discharge voltage-pulse-application stop signal output by the shape recognizing/correcting circuit 16 as required. Wv indicates a voltage waveform in the wire electrode 1 with a grounding potential set in the work 3. WIh indicates a waveform of a discharge current detected by the upper current sensor 13*a*. WI1 indicates a waveform of a discharge current detected by the lower current sensor 13*b*. WI is a waveform of a discharge current flowing between the electrodes obtained by adding up an upper discharge current Wh and a lower discharge current W1.

As indicated by S1 and S2 in FIG. 2, when discharge detection pulses 21*a* and 21*b* are input, the preliminary discharge voltage applied between the electrodes is at a zero level at rising edges of the discharge detection pulses 21*a* and 21*b*. Thus, until the start of preliminary discharge, in the normal discharge, a preliminary-discharge voltage pulse 20*a* having a long no-load time t1 as a pulse width is applied between the electrodes. In the instant discharge, a preliminary-discharge voltage pulse 20*b* having a short no-load time t2 as a pulse width is applied between the electrodes.

As indicated by S3 in FIG. 2, after elapse of an appropriate period after the input of the discharge detection pulse 21*a*, when it is determined that an electric discharge is the normal discharge, the pulse oscillator 10 causes the main-discharge power supply 6*b* to apply a main-discharge voltage pulse 22*a* having a long pulse width between the electrodes. When it is determined that an electric discharge is the instant discharge, since a state between the electrodes is close to an abnormal state such as a concentrated arc, the pulse oscillator 10 causes the main-discharge power supply 6*b* to apply a main-discharge voltage pulse 22*b* having a short pulse width between the electrodes. Therefore, as indicated by SI in FIG. 2, a main-discharge current pulse 26*a* at the time of the normal discharge becomes an electric current having a pulse longer and a peak higher than those of a main-discharge current pulse 26*b* at the time of the instant discharge.

According to the first embodiment, the preliminary-discharge voltage pulses 20*a* and 20*b* have a positive polarity and the main-discharge voltage pulses 22*a* and 22*b* have a negative polarity. However, polarities of the voltage pulses are arbitrary. Preliminary-discharge voltage pulses and main-discharge voltage pulses may have an identical polarity. The positive polarity and the negative polarity may be interchanged with each other at arbitrary timing.

As indicated by S4 in FIG. 2, before the main-discharge voltage pulses 22*a* and 22*b* are applied between the electrodes after the input of the discharge detection pulses 21*a* and 21*b*, that is, in a period in which preliminary discharge currents 25*a* and 25*b* flow between the electrodes, the pulse oscillator 10 generates trigger signals 23*a* and 23*b* for causing the preliminary-discharge-position determining circuit 14 to start the determination of preliminary discharge positions and gives the trigger signals 23*a* and 23*b* to the preliminary-discharge-position determining circuit 14. As indicated by S5 in FIG. 2, in a period in which main discharge currents 26*a* and 26*b* flow after the main-discharge voltage pulses 22*a* and 22*b* are turned off, the pulse oscillator 10 generates trigger signals 24*a* and 24*b* for causing the main-discharge-position determining circuit 15 to start the determination of main discharge positions and gives the trigger signals 24*a* to 24*b* to the main-discharge-position determining circuit 15.

The preliminary-discharge-position determining circuit 14 captures the discharge current WIh detected by the upper current sensor 13*a* in synchronization with rising edges of the trigger signals 23*a* and 23*b* in the period in which the preliminary discharge currents 25*a* and 25*b* flow. The main-discharge-position determining circuit 15 captures the discharge current WI1 detected by the lower current sensor 13*b* in synchronization with rising edges of the trigger signals 24*a* and 24*b* in the period in which the main discharge currents 26*a* and 26*b* flow. The preliminary-discharge-position determining circuit 14 and the main-discharge-position determining circuit 15 perform determination (measurement) of discharge positions on the wire electrode 1 according to a relation of magnitudes of both the discharge currents and the like and give a result of the determination to the shape recognizing/correcting circuit 16.

The preliminary discharge currents 25*a* and 25*b* are, depending on machining conditions, faint currents of about 10 amperes to 30 amperes. Thus, the preliminary discharge currents 25*a* and 25*b* are affected by various disturbances (e.g., a stray capacitance and a stray inductance). The trigger signals 23*a* and 23*b* may be originally identical with the discharge detection pulses 21*a* and 21*b*. However, here, time when disturbances at an initial period of an electric discharge are settled is selected. The time is adjusted to be timing at substantially the middle of the preliminary discharge currents 25*a* and 25*b*. Specifically, since a pulse width of the preliminary discharge currents 25*a* and 25*b* are about 300 nanoseconds to 600 nanoseconds, the trigger signals 23*a* and 23*b* are designed to be generated in a position delayed by 150 nanoseconds to 300 nanoseconds from the discharge detection pulses 21*a* and 21*b*.

As a method of generating trigger signals (S4 in FIG. 2) in the pulse oscillator 10, besides a method of using discharge detection pulses (S2 in FIG. 2) and adjusting the discharge detection pulses to timing optimum as triggers as described above (hereinafter, "voltage detection method"), it is also possible to adopt a method of grasping an instance when preliminary discharge currents flow and adjusting the instance to timing optimum as triggers (hereinafter, "current detection method"). Since there are some points of attention, the methods of generating trigger signals at the timing of S4 in FIG. 2 are explained in detail below.

A) voltage detection method: As described above, the voltage-between-electrodes detecting circuit 7 monitors, using the comparator, an instance when preliminary discharges occurs and a voltage-between-electrodes falls to a predetermined value (a preliminary-discharge voltage) from the time of application of a preliminary discharge voltage and outputs discharge detection pulses. At the time of the normal discharge and the instant discharge, since the discharge detection pulses 21*a* and 21*b* are surely input, the pulse oscillator 10 can easily generate the trigger signals 23*a* and 23*b*. However, at the time of the short circuit or in a situation in which impedance between the electrodes is low and only a voltage lower than discharge voltages at the time of the normal discharge and the instant discharge appears even if preliminary discharges occur, there is an inconvenience that the comparator does not operate and discharge detection pulses are not output. However, the preliminary discharge currents flow even if preliminary discharge voltages do not occur between the electrodes in the short circuit state. In the short circuit state, the pulse oscillator 10 also instructs the machining power supply 6 to output main-discharge voltage pulses as described above.

Thus, even if discharge detection pulses are not present at the timing of S2 in FIG. 2 when the pulse oscillator 10 stands by for input of discharge detection pulses, to allow the preliminary-discharge-position determining circuit 14 to measure preliminary discharge positions using preliminary discharge currents at that point, the pulse oscillator 10 includes a circuit that generates, when the pulse oscillator 10 determines that the short circuit has occurred and outputs an instruction for applying main-discharge voltage pulses to the machining power supply 6, trigger signals immediately before the output of the application instruction. It is possible to easily realize such a circuit.

B) Voltage detection method: In grasping an instance when preliminary discharge currents flow, the pulse oscillator 10 differentiates a detection signal of one of the upper and the lower current sensors 13a and 13b or a dedicated current sensor provided separately and generates pulses at an instance when the preliminary discharge currents flow. However, since capacitive loads are applied between the electrodes before starting an electric discharge when a voltage-between-electrodes is a no-load voltage, charge and discharge currents may flow between the electrodes. It is likely that the current sensors detect charge and discharge currents unrelated to an electric discharge.

Figure 3:
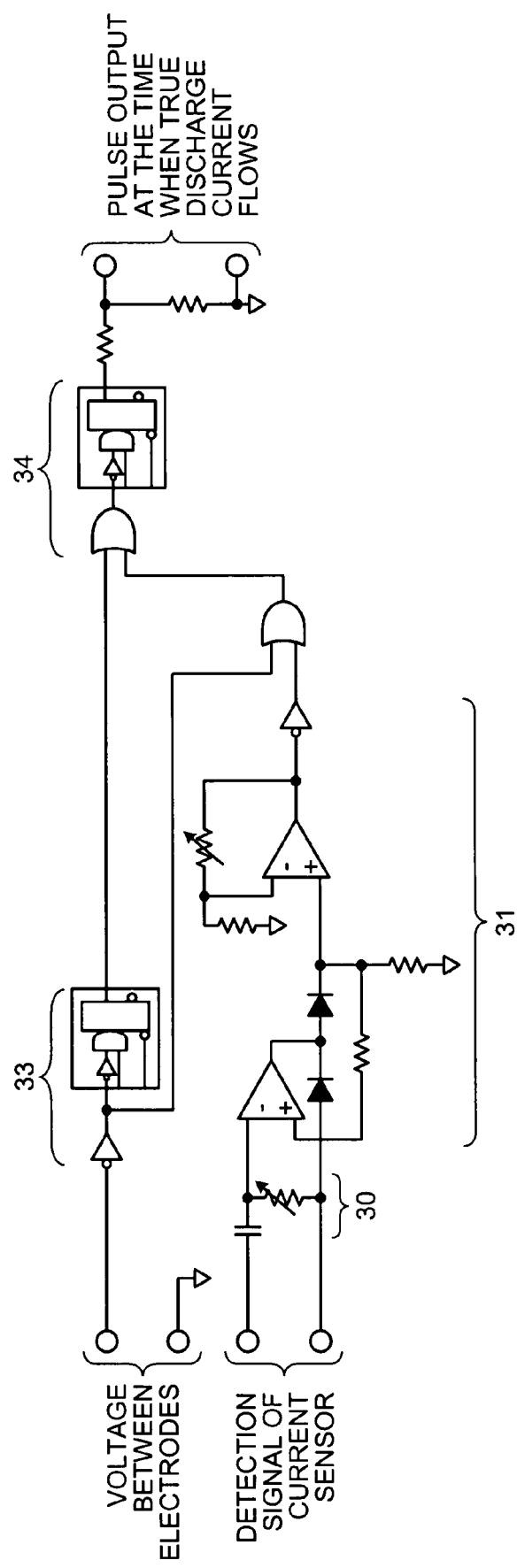
FIG. 3 is a circuit diagram of an example of a generation circuit for a trigger signal for determining preliminary discharge positions included in a pulse oscillator shown in FIG. 1.

Thus, for example, a circuit not reactive to the charge and discharge currents shown in FIG. 3 is provided in the pulse oscillator 10. FIG. 3 is a circuit diagram of an example of a generation circuit for a trigger signal for preliminary-discharge-position determination included in the pulse oscillator shown in FIG. 1. In FIG. 3, a mask circuit 31 is provided at a post stage of a circuit 30 that differentiates detection outputs of the current sensors. The pulse oscillator 10 causes the mask circuit 31 to invalidate differential signals of charge and discharge currents that appear in an output of the differentiating circuit 30 in a period in which a circuit 32 that detects a change in the voltage-between-electrodes detected by the voltage-between-electrodes detecting circuit 7 detects a preliminary discharge voltage (a no-load voltage) applied between the electrodes. The pulse oscillator 10 prevents a pulse generating circuit 33 from reacting to the charge and discharge currents in this no-load voltage period. The pulse oscillator 10 causes the pulse generating circuit 33 to react to a differential signal of a detection output of the current sensors at timing when the voltage-between-electrodes-change detecting circuit 32 detects a predetermined preliminary discharge voltage to which the preliminary discharge voltage falls. This makes it possible to generate a pulse at an instance when the preliminary discharge currents flow.

On the other hand, since the main discharge currents 26a and 26b are sufficiently larger than the preliminary discharge currents 25a and 25b, the pulse oscillator 10 can relatively freely set generation positions of the trigger signals 24a and 24b. Here, the pulse oscillator 10 is set to measure discharge positions at an instance when the application from the main-discharge power supply 6b stops (peak positions of the main discharge currents 26a and 26b). It is possible to perform signal processing with a higher SN ratio at a maximum value of a current waveform.

The preliminary-discharge-position determining circuit 14 measures discharge positions using preliminary discharge currents at the timing of S4 in FIG. 2, calculates an energy amount that the shape recognizing/correcting circuit 16 should input in the discharge positions measured, and outputs a result of the calculation to the pulse oscillator 10. In FIG. 2, after detection of occurrence of a preliminary discharge, main-discharge voltage pulses are started to be applied in all discharge positions and, thereafter, at the timing of S6 in FIG. 2, a main-discharge voltage-pulse-application stop signal 27 is output from the shape recognizing/correcting circuit 16 to the pulse oscillator 10. The main-discharge voltage-pulse-application stop signal 27 is represented by a broken line to emphasize that the main-discharge voltage-pulse-application stop signal 27 is generated as required.

To effectively perform shape correction, when means such as application of an extended pulse described later is not used, it is necessary to capture a current value and determine desirably within about 500 nanoseconds from the capture of the current value, whether a pulse is stopped. Therefore, as a method of determining discharge positions, it is possible to perform position determination in one clock by directly capturing a current value into a logical circuit as digital data using an AD converter and associating the current value with a calculation result table. It is possible to perform processing in a shorter time by calculating discharge positions after performing digital processing than by calculating a flow dividing ratio or the like in an analog circuit once. Thus, it is possible to change main discharge energy on a real time basis based on the discharge positions calculated from the preliminary discharge.

In FIG. 2, broken lines shown in the discharge voltage Wv and the discharge currents WIh to WI corresponding to the main-discharge voltage pulse 22a indicate the time when the main-discharge voltage-pulse-application stop signal 27 is output. Solid lines shown in the discharge voltage Wv and the discharge currents WIh to WI indicate the time when the main-discharge voltage-pulse-application stop signal 27 is not output.

When the main-discharge voltage-pulse-application stop signal 27 is output, the pulse oscillator 10 detects a rising edge of the main-discharge voltage-pulse-application stop signal 27 and immediately stops the application of the main-discharge voltage pulse 22a in S3 in FIG. 2. The main-discharge power supply 6b applies the main-discharge voltage pulse 22a indicated by a broken line having a pulse width shorter than a pulse width originally planned. According to the application of the main-discharge voltage pulse 22a, the discharge current WI has a current width shorter than a current width (indicated by a solid line) originally planned (has a current peak lower than a current peak originally planned). This means that machining energy is adjusted to be low.

According to the first embodiment, as indicated by WI in FIG. 2, a triangular wave current is used as the main discharge currents. Thus, when a voltage of the main-discharge power supply 6b is fixed, a current peak value proportional to a pulse width of the main-discharge voltage pulses is calculated. Machining energy can be approximated as proportional to a square of the pulse width. The shape recognizing/correcting circuit 16 only has to create the main-discharge voltage-pulse-application stop signal 27 based on such an idea.

It goes without saying that, although a current shape of the main discharge currents is a triangular wave shape in WI in FIG. 2, a current shape of the main discharge currents is not limited to this. The main discharge currents may be any current such as a rectangular wave current and a trapezoidal wave current. If a relation between machining energy and a pulse width of each of the currents is recognized, it is possible to adjust the machining energy according to adjustment of a pulse width corresponding to each of the current shapes.

On the other hand, when the main-discharge voltage-pulse-application stop signal 27 is not output, the pulse oscillator 10 refers to a necessary energy amount calculated by the shape recognizing/correcting circuit 16 and, then, selects a pulse width of the main-discharge voltage pulses in S3 in FIG. 2 and issues an instruction for stopping the application after elapse of time equivalent to the pulse width. However, when a processing ability of the shape recognizing/correcting circuit 16 is not sufficient, first, the pulse oscillator 10 starts to apply the main-discharge voltage pulses and, then, stops the output as required. It is possible to realize this constitution with likelihood in terms of time, that is, with a simpler circuit configuration that uses a low-speed element.

A relation of straightness accuracy to machining energy and a current between the electrodes is explained. Machining energy consumed between the electrodes when an electric discharge occurs once is represented as "discharge voltage× discharge current". Since the discharge voltage may be regarded as substantially fixed, the discharge current (a charge quantity) is proportional to the machining energy.

Total energy necessary for machining is obtained by multiplying the machining energy (the charge quantity) per one electric discharge by a discharge frequency f. For example, when an electric discharge is uniformly distributed in a wire direction, a machining amount and a machining shape with respect to the wire direction are determined according to energy (a charge quantity Q) per one electric discharge. When there is a bias in the number of electric discharges with respect to the wire direction even in a state in which energy per one electric discharge is fixed, a machining amount and a machining shape with respect to the wire direction are determined according to the bias (a frequency for each discharge position).

A first object of the present invention is adjustment of a machining shape by adjustment of machining energy. As described above, the machining energy W is represented as "machining energy W=charge quantity Q (=input power per one electric discharge)×discharge frequency f". Thus, as a method of adjusting the machining energy, it is possible to assume three ways of adjustment, namely, adjustment of the charge quantity Q, adjustment of the discharge frequency f, and both of the adjustments. According to the first embodiment, a method of adjustment for the charge quantity Q is explained. A method of adjusting, using preliminary discharge currents, main discharge currents following the preliminary discharge currents using the preliminary discharge currents is adopted.

It is desirable that discharge positions can be accurately determined from the preliminary discharge currents. However, as described above, sufficient positional accuracy may not be obtained because the preliminary discharge currents are small. Thus, according to the first embodiment, as shown in FIG. 1, the main-discharge-position determining circuit 15 is provided in addition to the preliminary-discharge-position determining circuit 14. After the main-discharge-position determining circuit 15 determines discharge positions at the timing of S5 in FIG. 2, the shape recognizing/correcting circuit 16 captures the data and compares the data with a result of determination of discharge positions in a preliminary discharge.

Specifically, for example, a correction table is provided in the shape recognizing/correcting circuit 16 to cause the shape recognizing/correcting circuit 16 to create a map of a result of determination of main discharge positions and a result of determination of preliminary discharge positions. When the result of determination of preliminary discharge positions deviate from the result of determination of main discharge positions, the shape recognizing/correcting circuit 16 is caused to operate to multiply the result of determination of preliminary discharge positions by a correction coefficient and improve accuracy of the next result of determination of preliminary discharge positions. Positional information obtained from the main-discharge-position determining circuit 15 is assumed to be accurate, to cause the shape recognizing/correcting circuit 16 to accumulate machining energy in an X (Y) coordinate position of the positional information as data for each Z-axis. Since the triangular wave current is used according to the first embodiment, as the machining energy, machining energy proportional to an operation time of the main-discharge power supply 6b, that is, a square of the pulse width of the main-discharge voltage pulses 22a and 22b indicated by S3 in FIG. 2 is used.

Figure 4:
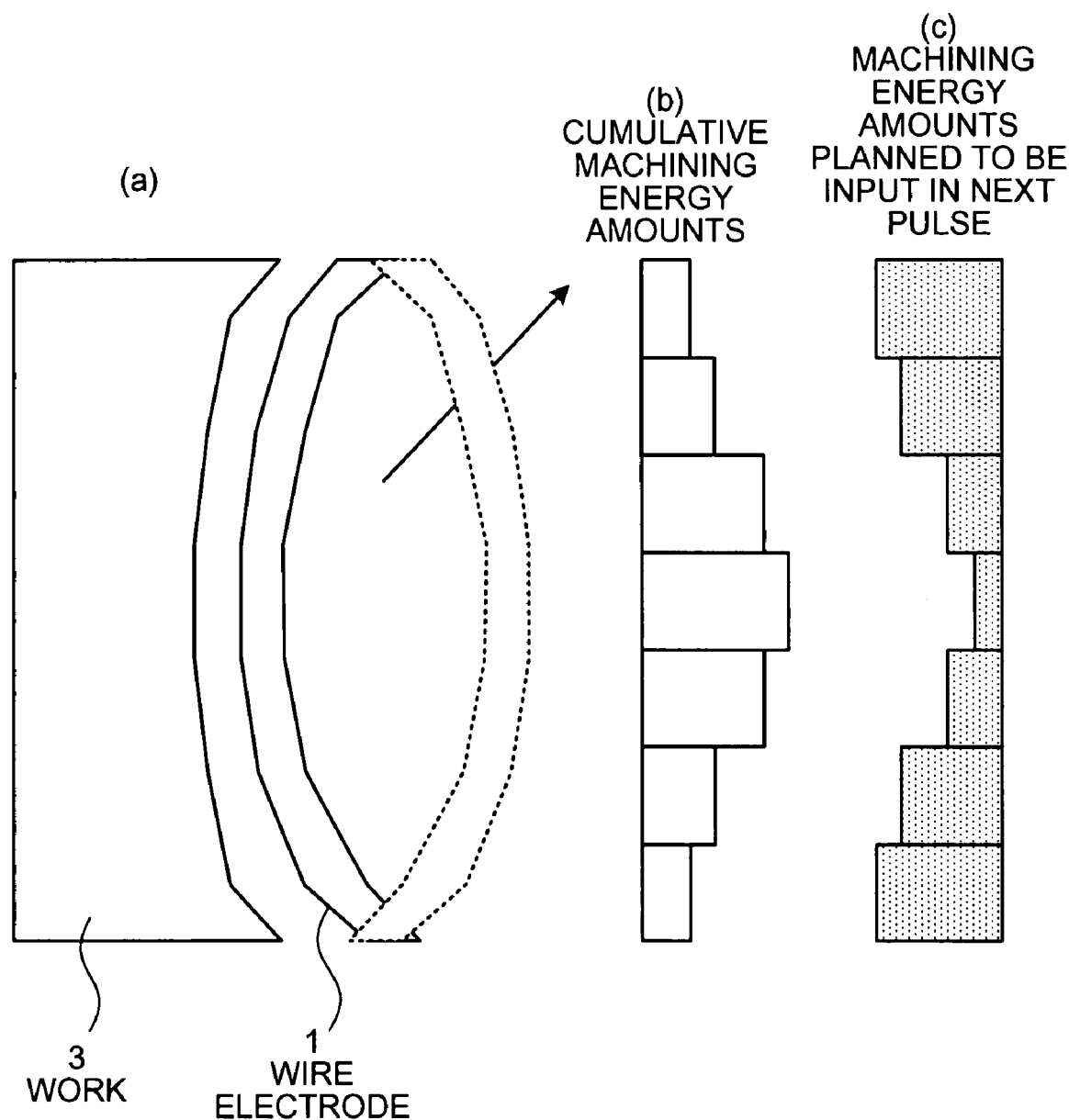
FIG. 4 is a conceptual diagram for explaining a machining method realized by the wire electric discharge machining apparatus shown in FIG. 1.

Operations at the time when the main-discharge-position determining circuit 15 is added are explained with reference to FIG. 4. FIG. 4 is a conceptual diagram for explaining a machining method realized by the wire electric discharge machining apparatus shown in FIG. 1. When machining in an XY plane progresses while the wire electrode 1 oscillates as shown in FIG. 4(a), the work 3 is machined in a shape according to the oscillation of the wire electrode 1. As shown in FIG. 4(b), a machining energy amount on the Z-axis in that case is accumulated for each X(Y) coordinate position of the work 3. As shown in FIG. 4(c), the cumulative machining energy amounts accumulated are reversed or the cumulative machining energy amounts accumulated are multiplied by an arbitrary coefficient to cause the cumulative machining energy amounts to stand by as machining energy amounts planned to be input in the next pulse.

Time for these kinds of cumulative machining energy only has to be in a range of, for example, several hundreds microseconds to several milliseconds. Positions of the cumulative machining energy only have to be arranged at intervals of, for example, about 10 millimeters. When a work having a complicated board thickness is machined under such conditions, it is likely that a shape in the Z-axis direction (a wire traveling direction) of the work changes in the middle of the machining. In this case, the cumulative machining energy is substantially concentrated in a certain portion of the work. When no electric discharge can be detected in the range of several hundred microseconds to several milliseconds, that is, when machining energy is zero, it is determined that the work 3 is not present in the position where the machining energy is zero and the position is excluded from a machining object (the machining energy amount planned to be input).

In short, in the present invention, the main-discharge-position determining circuit 15 is unnecessary when positional accuracy of the determination in the preliminary-discharge-position determining circuit 14 is sufficiently high. In other words, the discharge-position determining unit may include only the preliminary-discharge-position determining circuit 14. A circuit size is reduced because the main-discharge-position determining circuit 15 is unnecessary. The accumulation of machining energy is calculated from a position, which is calculated from the result of determination of preliminary discharge positions, and a set pulse width of a main-discharge voltage pulse applied to the position. If discharge positions are specified by the next determination of preliminary discharge positions, a discharge current is fed from the main-discharge power supply 6b by the application of the main-discharge voltage pulse until the machining energy reaches the machining energy planned to be input.

When the preliminary-discharge-position determining circuit 14 is used in this way, it is possible to specify a discharge position that is about to be machined. Thus, it is possible to design an amount of energy to be input and obtain an arbitrary machining shape in the Z-axis direction (the wire traveling direction). In the case of the first embodiment, it is possible to use this for improvement of straightness accuracy.

In the above explanation, calculation and output adjustment of cumulative machining energy are performed using a pulse width. This makes it easy to realize adjustment of machining energy by adjusting only a control signal with a sample circuit configuration. According to the first embodiment, it is also possible to carry out adjustment of machining energy by changing not only a pulse width but also a power supply voltage every time an electric discharge occurs rather than keeping a fixed power supply voltage.

In this case, if the power supply voltage is variable, a current waveform is a waveform with a gentle inclination. The main-discharge power supply 6b is generally constituted by arranging switching elements such as FETs in parallel. Thus, even when the power supply voltage is not variable but fixed, if the number of operations of these FETs is changed, it is possible to set an inclination of a current waveform gentle by making use of a change in ON resistance. If the power supply voltage or the number of FETs arranged in parallel is changed every time an electric discharge occurs, it is possible to more closely adjust machining energy. As a result, accuracy of a target machining shape is improved.

It goes without saying that, for calculation of cumulative machining energy, in addition to correction of a pulse width, correction for, for example, multiplying the pulse width by a coefficient corresponding to a power supply voltage or the number of FETs arranged in parallel is necessary. More precisely, machining currents may be integrated and captured as a charge quantity. Even if an inclination or the like of a current waveform or a current waveform shape substantially changes to a rectangular wave, a trapezoidal wave, and the like, since it is possible to directly capture machining currents as machining energy, calculation of cumulative machining energy is accurate.

In the above explanation, cumulative machining energy is accumulated for each discharge position (Z-axis) and a machining amount of a work that should be subjected to an electric discharge in the discharge position is calculated. However, when a machining shape is empirically known in advance according to a machining position, it is not always necessary to comply with these steps. For example, when it is empirically predicted that the center of a wire usually swells, machining energy may be arbitrarily adjusted not based on calculation at a stage when it is known that discharge positions are near positions above and under the wire or near the center of the wire.

As explained with reference to FIG. 2, according to the first embodiment, at a stage of a preliminary discharge, states between the electrodes are divided into three states between the electrodes, namely, the "normal discharge" having a long no-load time, the "instant discharge" having a short no-load time, and the "short circuit" in which no voltage appears between the electrodes even if a preliminary discharge pulse is applied. It may be considered that, among these states between the electrodes, the "normal discharge" mainly contributes to machining.

Thus, machining energy adjustment according to the first embodiment is basically performed with attention directed to only the "normal discharge". However, it goes without saying that the machining energy adjustment may be performed in only the "normal discharge" and the "instant discharge" or in all the states between the electrodes including the "normal discharge", the "instant discharge", and the "short circuit". The calculation of cumulative machining energy may be performed only at the time of the "normal discharge", may be performed only at the time of the "instant discharge", or may be performed in all the states between the electrodes including the "normal discharge", the "instant discharge", and the "short circuit". A method of calculation of cumulative machining energy and an actual method of adjusting machining energy may be independent from each other. For example, cumulative machining energy is calculated in the "normal discharge" and the "instant discharge" and machining energy adjustment is performed only in the "normal discharge". It is possible to arbitrarily select these methods according to positional accuracy, measurement accuracy, machining shape accuracy after adjustment, and all other situations. If all the states are calculated and adjusted, the shape recognizing/correcting circuit 16 is complicated and a size thereof is increased because of the calculation and adjustment. On the other hand, if attention is directed to only any one of the states, it is possible to simplify the shape recognizing/correcting circuit 16.

Second Embodiment

In the example a constitution described according to the first embodiment explained above, when it is assumed that an arc voltage is fixed, the machining-energy adjusting unit, which adjusts machining energy that can be calculated as a product of the charge quantity Q set as input power for each electric discharge and the discharge frequency f, adjusts the charge quantity Q, or adjusts a following main discharge current using a preliminary discharge current. In a second embodiment of the present invention, an example of a constitution in adjusting the discharge frequency f is explained with reference to FIG. 5.

Figure 5:
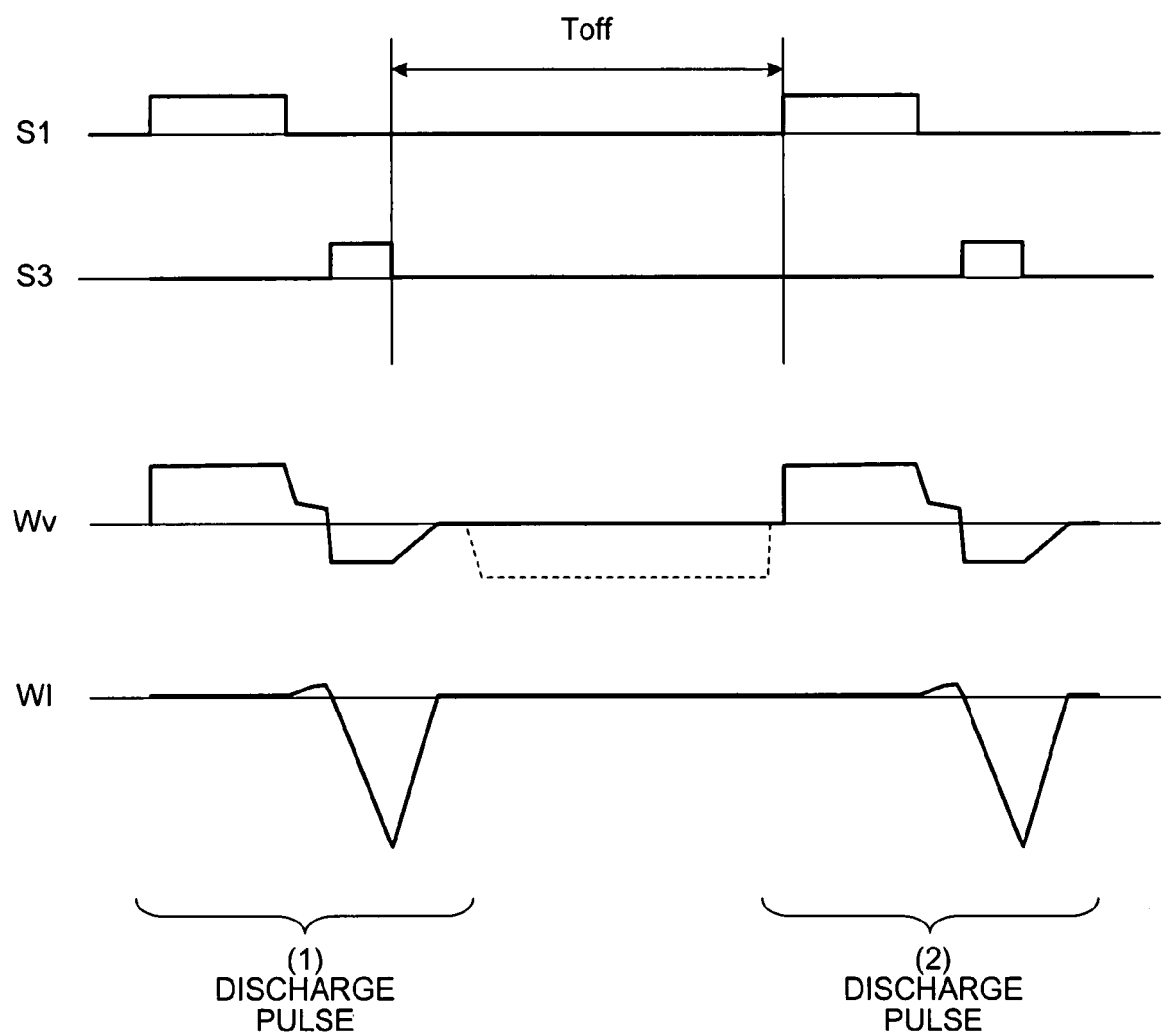
FIG. 5 is a time chart for explaining operations of a wire electric discharge machining apparatus according to a second embodiment of the present invention.

FIG. 5 is a time chart for explaining operations of a wire electric discharge machining apparatus according to the second embodiment of the present invention. S1, S3, Wv, and WI shown in FIG. 5 denote a waveform of a preliminary-discharge voltage pulse, a waveform of a main-discharge voltage pulse, a discharge voltage waveform between the electrodes, and a discharge current waveform, respectively, as according to the first embodiment (FIG. 2). Toff indicates a period in which neither the preliminary-discharge voltage pulse S1 nor the main-discharge voltage pulse S3 is applied and indicates a pause period in which a voltage-between-electrodes is nearly 0 volt, that is, an electric discharge does not occur. A discharge pulse (1) at the time of the last electric discharge and a discharge pulse (2) at the time of the present electric discharge are distinguished with the period Toff, in which no electric discharge occurs, placed between the discharge pulses.

Determination of discharge positions may be performed using preliminary discharge currents as according to the first embodiment or may be performed based on main discharge currents as described later. It is surmised that, in both the cases, discharge positions do not substantially different in every electric discharge. This is because the discharge positions depend on wire oscillation. In other words, discharge positions of the discharge pulse (1) at the time of the last electric discharge and the discharge pulse (2) at the time of the present electric discharge are generally the same.

When the pause time Toff is short, for example, about 2 microseconds to 10 microseconds, the discharge positions of the discharge pulse (1) and the discharge pulse (2) are close to each other. However, when the pause period Toff is long, for example, equal to or longer than 10 microseconds (realistically, equal to or shorter than 10 milliseconds), the discharge positions of the discharge pulses separate from each other according to time of the period Toff in which no electric discharge occurs. It is possible to estimate a general time range of this pause period Toff from a wire oscillation period.

In this way, if the pause period Toff is set short, electric discharges in an identical place increase. Thus, the discharge frequency f in that machining position increases. On the contrary, if the pause period Toff is set long, electric discharges hardly occur in an identical place. Thus, the discharge frequency in that machining position decreases. In other words, since it is possible to adjust a discharge frequency for each machining position, it is possible to adjust machining energy. This makes it possible to obtain an arbitrary machining shape.

To facilitate understanding, a discharge frequency is changed by adjusting the "pause time". However, a form of changing the discharge frequency is not limited to the form of "pause". Since an interval of electric discharges for adjusting an increase or a decrease in the discharge frequency means an interval of main discharges, the form of changing the discharge frequency may be any form as long as it possible to control a time interval of main discharge pulses. Specifically, for example, as indicated by a dotted line in the middle of the voltage waveform Wv between the electrodes shown in FIG. 5, the form of changing the discharge frequency may be a form of applying a pulse unrelated to the application of the main-discharge voltage pulse S3. Alternatively, the form of changing the discharge frequency may be a form of immediately applying the preliminary-discharge voltage pulse S1 without the pause period Toff after the end of the main-discharge voltage pulse S3 but not applying a main discharge pulse during the pause period Toff even if a preliminary discharge occurs.

Moreover, when so-called normal discharge, instant discharge, short circuit, and the like are determined according to a state between the electrodes, the time interval Toff may be controlled with reference to the interpolation state. Specifically, a form of performing Toff control in the case of the normal discharge in which the state between the electrodes is satisfactory and not performing the Toff control when it is determined that the short circuit occurs may be adopted. Usually, since a charge quantity of the normal discharge is set larger than that in the short circuit state, an influence on a machining shape is larger in the normal discharge. Therefore, if the Toff control is performed only when the normal discharge occurs, it is possible to obtain a desired machining shape with high efficiency of time.

On the contrary, a form of not performing the Toff control in the case of the normal discharge in which the state between the electrodes is satisfactory and performing the Toff control only when it is determined that the short circuit (or the instant discharge) occurs may be adopted. In the states of the short circuit and the instant discharge, a distance between the electrodes is small and electric discharges essentially occur in an identical place. In other words, the states of the short circuit and the instant discharge can be considered states in which a discharge frequency in an identical discharge position tends to increase. Therefore, it is possible to effectively obtain a desired machining shape by performing the Toff control only at the time of the short circuit and the instant discharge. These control forms only have to be arbitrarily selected according to a state of a machining apparatus and a machining state.

Third Embodiment

When a relatively long time is required for determining a position and reading out an energy amount after a preliminary discharge current flows, it is likely that generation of a main-discharge voltage-pulse-application stop signal is late for stopping application of a main-discharge voltage pulse and machining is completed without using the main-discharge voltage-pulse-application stop signal generated. In a third embodiment of the present invention, an example of a constitution for coping with this problem is explained. This is an example of a constitution of a mechanism of the discharge-generation control unit.

In this case, the fact that machining energy is proportional to a charge quantity is utilized. A method of keeping an extremely small electric discharge (which is called "extended discharge") after preliminary discharge to feed a discharge current (which is called "extended discharge current") for a predetermined period and, then, switching the preliminary discharge to a main discharge. As this method, there are two kinds as shown in FIG. 6.

Figure 6:
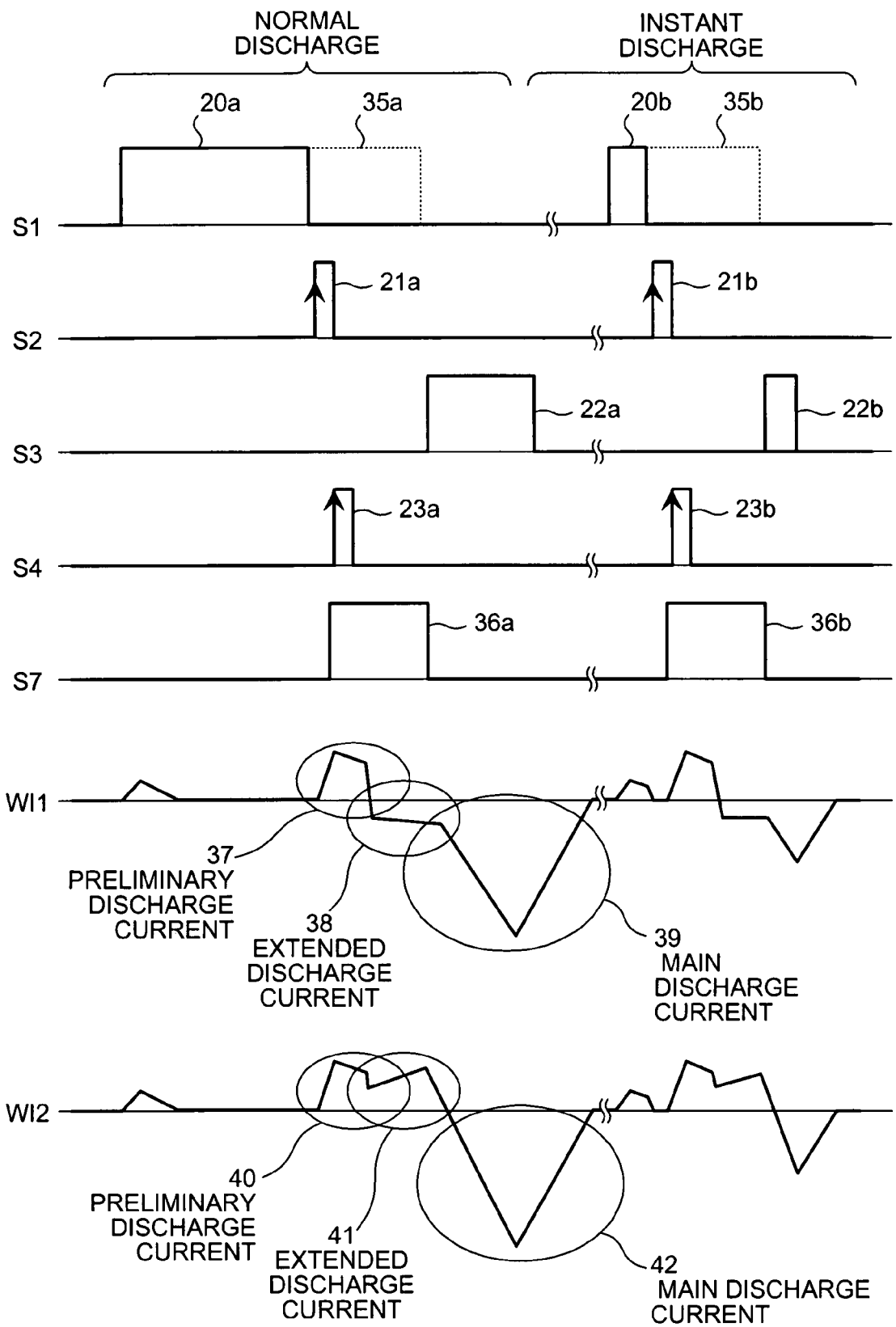
FIG. 6 is a time chart for explaining operations of a wire electric discharge machining apparatus according to a third embodiment of the present invention.

FIG. 6 is a time chart for explaining operations of a wire electric discharge machining apparatus according to the third embodiment. S1 to S4 in FIG. 6 correspond to S1 to S4 in FIG. 2. In S1 in FIG. 6, voltage pulses of a predetermined pulse width (which is called "extended-discharge voltage pulses") 35a and 35b are added to the preliminary-discharge voltage pulse 20a and 20b. In S3 in FIG. 6, the main-discharge voltage pulses 22a and 22b are generated with a delay of the pulse width of the extended-discharge voltage pulses 35a and 35b.

Pulse signals 36a and 36b shown in S7 in FIG. 6 are control signals for carrying out the extended discharge. The pulse signals 36 and 36b rise substantially in synchronization with the rising edges of the discharge detection pulses 21a and 21b and fall after the elapse of a time width, which is the same as the pulse width of the extended-discharge voltage pulses 35a and 35b. In other words, the extended-discharge voltage pulses 35a and 35b are generated by the control signals 36a and 36b.

WI1 and WI2 in FIG. 6 indicate a first discharge current and a second discharge current generated by the two kinds of methods described above. The first and the second discharge currents at the time of the normal discharge are explained. In the first discharge current WI1, after a preliminary discharge current 37 of a positive polarity, a faint extended discharge current 38 of a negative polarity flows for a predetermined period. Subsequently, a main discharge current 39 of a negative polarity flows. In the second discharge current WI2, after a preliminary discharge current 40 of a positive polarity, an extended discharge current 41 of the same positive polarity flows for a predetermined period. Subsequently, a main discharge current 42 of a positive polarity flows. The extended discharge current 41 in this case has a magnitude that is equivalent to or larger than that of the preliminary discharge current 40 and is sufficiently smaller than that of the main discharge current 42.

Figure 7:
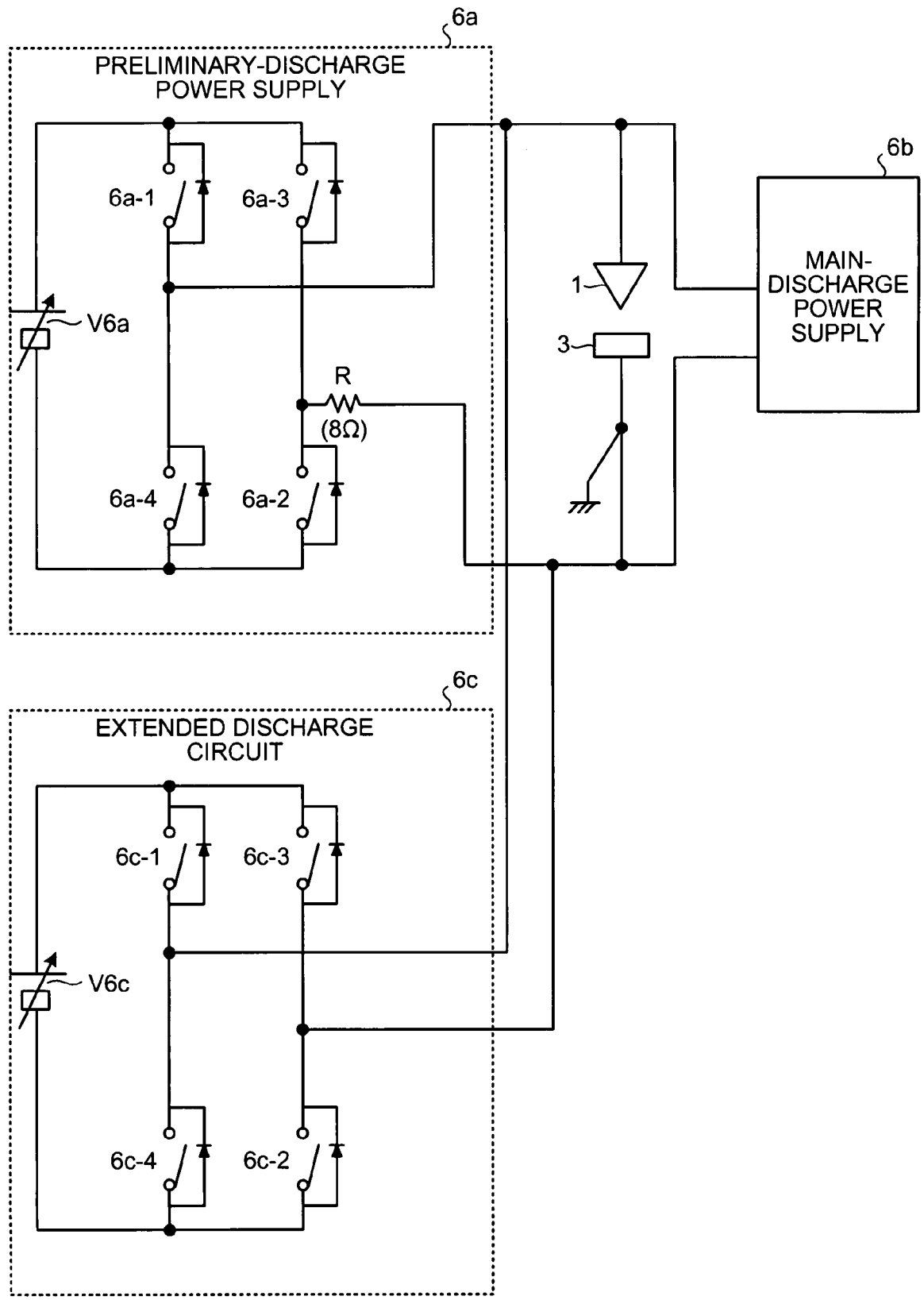
FIG. 7 is a circuit diagram of an example of a circuit that generates a first discharge current WI1 shown in FIG. 6.
Figure 8:
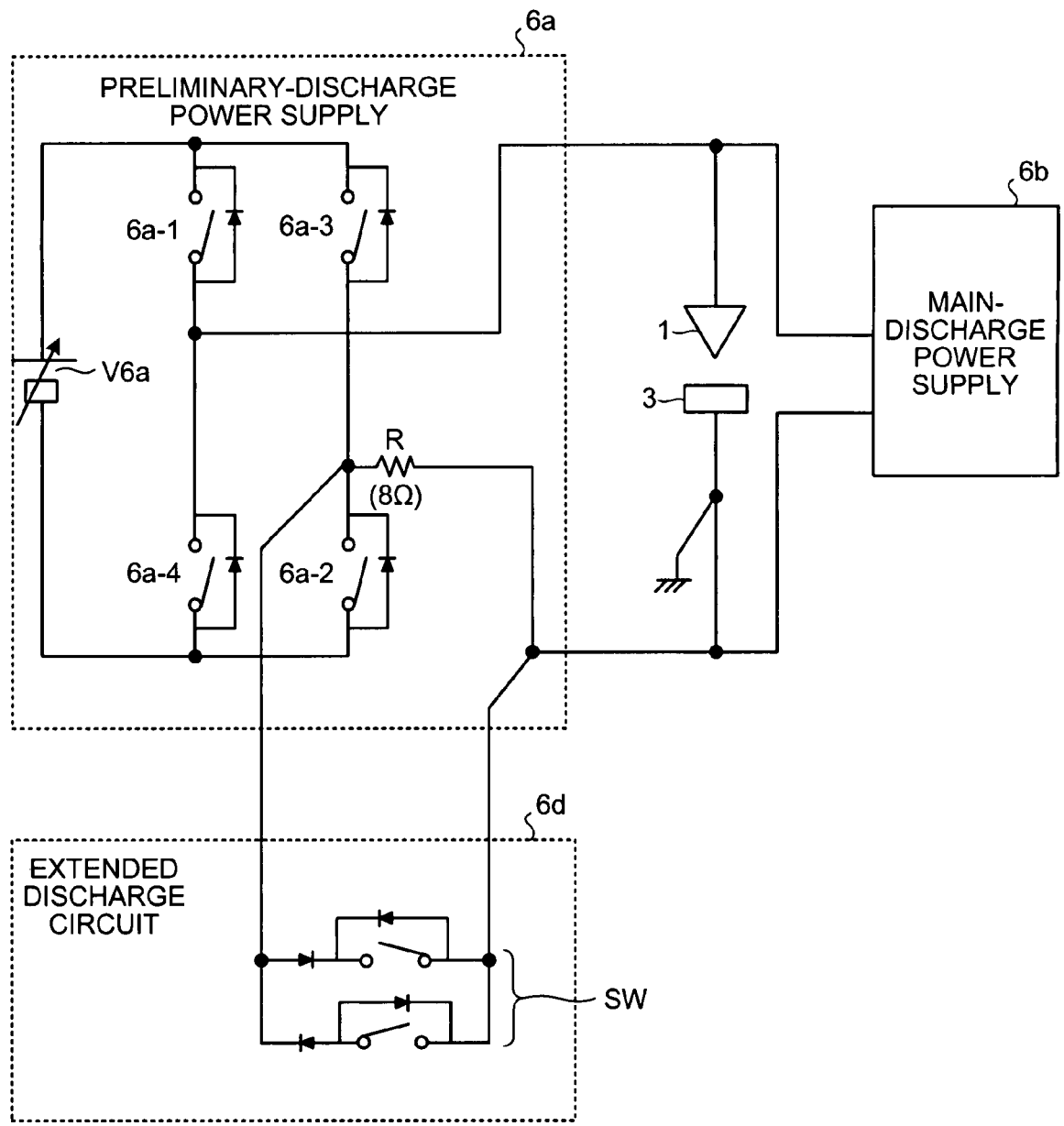
FIG. 8 is a circuit diagram showing an example of a circuit that generates a second discharge current WI2 shown in FIG. 6.

FIG. 7 is a diagram of a circuit configuration of an example of a circuit that generates the first discharge current WI1 shown in FIG. 6. FIG. 8 is a diagram of a circuit configuration of an example of a circuit that generates the second discharge current WI2 shown in FIG. 6.

In the circuit that generates the first discharge current WI1 shown in FIG. 7, an extended discharge circuit 6c that generates the extended discharge current 38 is connected in parallel to the main-discharge power supply 6b and the preliminary-discharge power supply 6a. The preliminary-discharge power supply 6a includes a DC power supply V6a and four FETs 6a-1 to 6a-4 that constitute a switching circuit. In the four FETs 6a-1 to 6a-4, a series circuit of the FETs 6a-1 and 6a-4 and a series circuit of the FETs 6a-2 and 6a-3 are connected to the DC power supply V6a in parallel. A series connection terminal of the FETs 6a-1 and 6a-4 is connected to the wire electrode 1 and a series connection terminal of the FETs 6a-2 and 6a-3 is connected to the work 3 via a current limiting resistor R. In this way, in the preliminary-discharge power supply 6a, in general, the current limiting resistor R (resistance of which is, for example, 8 ohms) having high impedance is inserted between the electrodes in series.

The extended discharge circuit 6c also includes a DC power supply V6c and four FETs 6c-1 to 6c-4 that constitute a switching circuit. In the four FETs 6*c*-1 to 6*c*-4, a series circuit of the FETs 6*c*-1 and 6*c*-4 and a series circuit of the FETs 6*c*-2 and 6*c*-3 are connected to the DC power supply V6*c* in parallel. A series connection terminal of the FETs 6*c*-1 and 6*c*-4 is connected to the wire electrode 1 and a series connection terminal of the FETs 6*c*-2 and 6*c*-3 is connected to the work 3.

The DC power supply V6*c* of the extended discharge circuit 6*c* desirably has a power supply voltage equal to or larger than a preliminary-discharge power supply voltage because an arc is less easily broken. However, the DC power supply V6*c* does not always have to be higher than the preliminary-discharge power supply voltage and only has to be equivalent to the preliminary-discharge power supply voltage. Nevertheless, when a current limiting resistor having high impedance similar to the preliminary-discharge power supply 6*a* is inserted between the electrodes in series, it is likely that an arc cannot be maintained. Thus, it is necessary to design the resistance of the DC power supply V6*c* to be at least smaller than the resistance (8 ohms) used in the preliminary-discharge power supply. Therefore, in the extended discharge circuit 6*c* shown in FIG. 7, the current limiting resistor is not inserted between the electrodes.

The operations of the circuit that generates the first discharge current WI1 shown in FIG. 7 are explained with reference to FIG. 6. For convenience of explanation, the operations at the time of the normal discharge are described. In S1 in FIG. 6, the FETs 6*a*-1 and 6*a*-2 are turned on to apply a preliminary-discharge voltage between the electrodes. In S2 in FIG. 6, when the discharge detection pulse 21*a* is input, the FETs 6*a*-1 and 6*a*-2 are turned off. In other words, the preliminary-discharge voltage pulse 20*a* is applied between the electrodes. At the same time, in S7 in FIG. 6, the FETs 6*c*-3 and 6*c*-4 are turned on at the rising edge of the control signal 36*a*. The FETs 6*c*-3 and 6*c*-4 are turned off at the falling edge of the control signal 36*a*. At the same time, the main-discharge voltage pulse 22*a* is output from the main-discharge power supply 6*b*.

Consequently, in the initial stage of an electric discharge, the preliminary discharge current 37 of a positive polarity flows in a loop of the DC power supply V6*a*→the FET 6*a*-1→the wire electrode 1→the work 3→the current limiting resistor R→the FET 6*a*-2→the DC power supply V6*a*. When the application time (the pulse width) of the preliminary-discharge voltage pulse 20*a* elapses, the faint extended discharge current 38 of a negative polarity immediately starts to flow in a loop of the DC power supply V6*c*→the FET 3*c*-3→the work 3→the wire electrode 1→the FET 3*c*-4→the DC power supply V6*c*. The extended discharge current 38 flows until the point of the falling edge of the control signal 36*a*. At the point of the falling edge of the control signal 36*a*, the main discharge current 39 of the same negative polarity immediately starts to flow.

On the other hand, as shown in FIG. 6, the extended discharge current 41 in the second discharge current WI2 has the same polarity as the preliminary discharge current 40 and has a magnitude equal to or larger than that of the preliminary discharge current 40. Thus, as a relation between the extended discharge current 41 and the preliminary discharge current 40, the extended discharge current 41 is considered to intensify the preliminary discharge current 40. Therefore, in the circuit shown in FIG. 7, the extended discharge circuit in the circuit that generates the second discharge current WI2 may be constituted by a power supply equivalent to the preliminary-discharge power supply 6*a*. However, in this explanation, an example of other constitutions is described.

In the circuit that generates the second discharge current WI2 shown in FIG. 8, as a simpler circuit configuration, an extended discharge circuit 6*d* is provided instead of the extended discharge circuit 6*c* in the circuit shown in FIG. 7. The extended discharge circuit 6*d* is built in the preliminary-discharge power supply 6*a* as a part of the circuit and constituted by two bidirectional switches SW connected in parallel to the current limiting resistor R.

Operations of the circuit that generates the second discharge current WI2 shown in FIG. 8 are explained with reference to FIG. 6. For convenience of explanation, the operations at the time of the normal discharge are described. In S1 in FIG. 6, the FETs 6*a*-1 and 6*a*-2 are turned on to apply a preliminary discharge voltage between the electrodes. In S2 in FIG. 6, even when the discharge detection pulse 21*a* is input, the FETs 6*a*-1 and 6*a*-2 are not turned off but are kept on. At the same time, in S7 in FIG. 6, the bidirectional switches SW are turned on at the rising edge of the control signal 36*a*. The FETs 6*a*-1 and 6*a*-2 and the bidirectional switch SW are turned off at the falling edge of the control signal 36*a* after the elapse of time equivalent to the pulse width of the control signal 36*a*. At the same time, the main-discharge voltage pulse 22*a* is output from the main-discharge power supply 6*b*. In other words, instead of the preliminary-discharge voltage pulse 20*a*, a voltage pulse with a long pulse width obtained by adding the extended-discharge voltage pulse 35*a* to the preliminary-discharge voltage pulse 20*a* is applied between the electrodes at the initial stage of the electric discharge.

Consequently, at the initial stage of the electric discharge, the preliminary discharge current 40 of a positive polarity flowing via the current limiting resistor R passes the bidirectional switches SW having low impedance and starts to flow as the extended discharge current 41 of the same polarity. The extended discharge current 41 flows until the point of the falling edge of the control signal 36*a*. At the point of the falling edge of the control signal 36*a*, the main discharge current 42 of a negative polarity immediately starts to flow.

In this way, according to the third embodiment, it is possible to delay timing for supplying the main discharge current. Thus, it is possible to determine a position of a preliminary discharge, secure sufficient time until the shape recognizing/correcting circuit instructs the pulse oscillator to input an optimum machining energy amount, and adjust an amount of machining by the main-discharge voltage pulse more dynamically. For example, when the main-discharge voltage-pulse-application stop signal rises before output timing of the main-discharge voltage pulse, the main discharge current is not fed any more. The shape recognizing/correcting circuit is inexpensive and has a simple circuit configuration because high-speed components are not necessary any more.

The extended discharge circuit needs to have impedance lower than that of the preliminary-discharge power supply such that an arc discharge can be maintained as described above and needs to have impedance higher than that of the main-discharge power supply to more accurately measure and adjust a machining amount. Based on such an idea, as shown in FIG. 8, the extended discharge circuit may be formed by changing a part of the main-discharge power supply to have high impedance rather than changing a part of the preliminary-discharge power supply to have low impedance. For example, in general, FETs are arranged in parallel in the main-discharge power supply to secure a current capacity. If only a part of the FETs are turned on, it is possible to drive the FETs at impedance higher than that of the main-discharge power supply usually in use and cause the FETs to operate as the extended discharge circuit.

Fourth Embodiment

Figure 9:
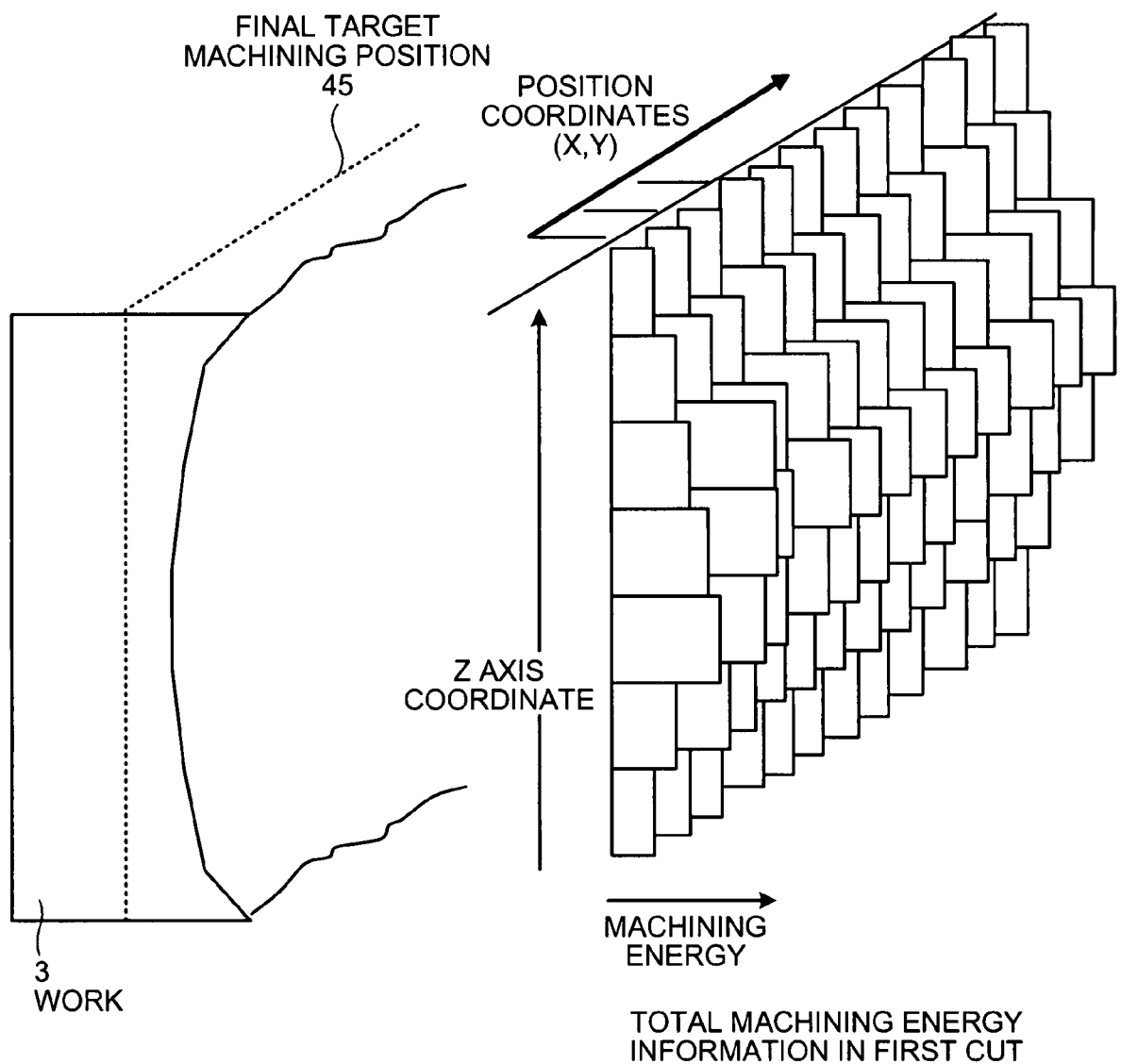
FIG. 9 is a conceptual diagram for explaining a machining method realized by a wire electric discharge machining apparatus according to a fourth embodiment of the present invention.

FIG. 9 is a conceptual diagram for explaining a machining method realized in a wire electric discharge machining apparatus according to a fourth embodiment of the present invention. In the first and the third embodiments, the improvement of straightness in the first cut (rough machining) is explained. In a fourth embodiment of the present invention, in the structure shown in FIG. 1, the shape recognizing/correcting circuit 16 does not perform machining energy adjustment and is solely used as a shape monitor in the first cut and performs machining energy adjustment in the second cut.

In FIG. 9, positional information determined by the main-discharge-position determining circuit 15 in the first cut and machining energy input thereto are output from the shape recognizing/correcting circuit 16 to the control device 11 and entirely captured by the control device 11. In the determination of a discharge position, the main-discharge-position determining circuit 15, which can more easily determine a discharge position, is used. However, it goes without saying that the preliminary-discharge-position determining circuit 14 may be used.

The shape recognizing/correcting circuit 16 is capable of operating as a shape monitor at the time of the first cut by saving two-dimensional positional information of X and Y axes and machining energy for each Z-axis in a storing device serving as a storing unit included in the control device 11. Since an amount obtained by reversing the machining energy is a machining amount of the work 3, in the example shown in FIG. 9, upper and lower ends are not machined well with respect to a final target machining position 45 of the work 3.

Thus, in the second cut, the shape recognizing/correcting circuit 16 causes the pulse oscillator 10 to output, for each of the X and Y axes, an amount that should be machined in respective positions in the Z-axis direction from the control device 11. The pulse oscillator 10 outputs a command to the machining power supply 6. At the second cut level, although a current value itself of the main discharge current is low, since the work is machined using the two power supplies, that is, the preliminary-discharge power supply 6a and the main-discharge power supply 6b, a method of specifying a discharge position from the preliminary discharge current and adjusting machining energy of the main-discharge power supply 6b may be adopted as according to the first embodiment. In this way, in the fourth embodiment, the shape recognizing/correcting circuit 16 operates as a shape predicting unit and a machining-energy adjusting unit using the control device 11.

Since the adjustment of machining energy is not performed in the first cut, machining speed of the first cut increases. In the second cut, since an amount that should be machined is obtained in advance, the shape recognizing/correcting circuit 16 is not required of high speed and a large capacity. It is possible to realize improvement of straightness accuracy with a simple constitution.

Since a machining energy amount is measured for each discharge position and captured into the control device 11 in the second cut, it is possible to monitor a present machining shape both in the first cut and the second cut make use of the machining shape for condition setting in the third and the subsequent cuts. In all time domains in the third and the subsequent cuts, in general, the main-discharge power supply 6b is not used any more and faint machining is performed using the preliminary-discharge power supply 6a.

FIG. 10 is a diagram of an example of voltage and current waveforms under a finish machining conditions compared with voltage and current waveforms under rough machining conditions. FIG. 10(*a*) shows an example of voltage and current waveforms under the rough machining conditions. FIG. 10(*b*) shows an example of voltage and current waveforms under the finish machining (fine machining) conditions. As shown in FIGS. 10(*a*) and 10(*b*), a peak current value under the finish machining (fine machining) conditions is about several amperes to several tens amperes, which is equal to or lower than a preliminary discharge current under the rough machining conditions. However, a discharge frequency is about several megahertz, which is considerably higher than several tens kilohertz under the rough machining conditions. In a time domain of this finish machining, since there is no idea of the preliminary discharge current 47 and the main discharge current 48 under the rough machining conditions, it is difficult to measure discharge positions on a real time basis and reduce machining energy.

However, under the finish machining (fine machining) conditions, since a shape of a work is grasped in advance, it is possible predict positions of electric discharges simply by recognizing the X and Y coordinates. For example, if it is possible to predict, according to the predicted machining shape, places where a discharge gap narrows when the wire electrode approaches and an electric discharge can be easily performed, a machining current with input machining energy adjusted in advance only has to be fed. In inputting machining energy, the machining current is not fed through the discharge-position determining circuit any more. However, discharge positions only have to be measured by a machining current actually fed to realize correction of the predicted machining shape and predicted discharge positions.

A level of the machining energy is a level that cannot be sufficiently adjusted during time in which a discharge current pulse is flowing. This is because charges accumulated as capacitive loads when the space between the electrodes is in an open (non-discharge) state flow in as a machining current simultaneously with an electric discharge and the electric discharge ends. In other words, even if the preliminary discharge voltage is kept applied between the electrodes, a cycle of charging in the discharge gap (the space between the electrodes)→increase in a voltage-between-electrodes→start of an electric discharge→fall in the voltage-between-electrodes→stop of the electric discharge→charging in the discharge gap progresses irrespective of the application of the preliminary discharge voltage.

Figure 11:
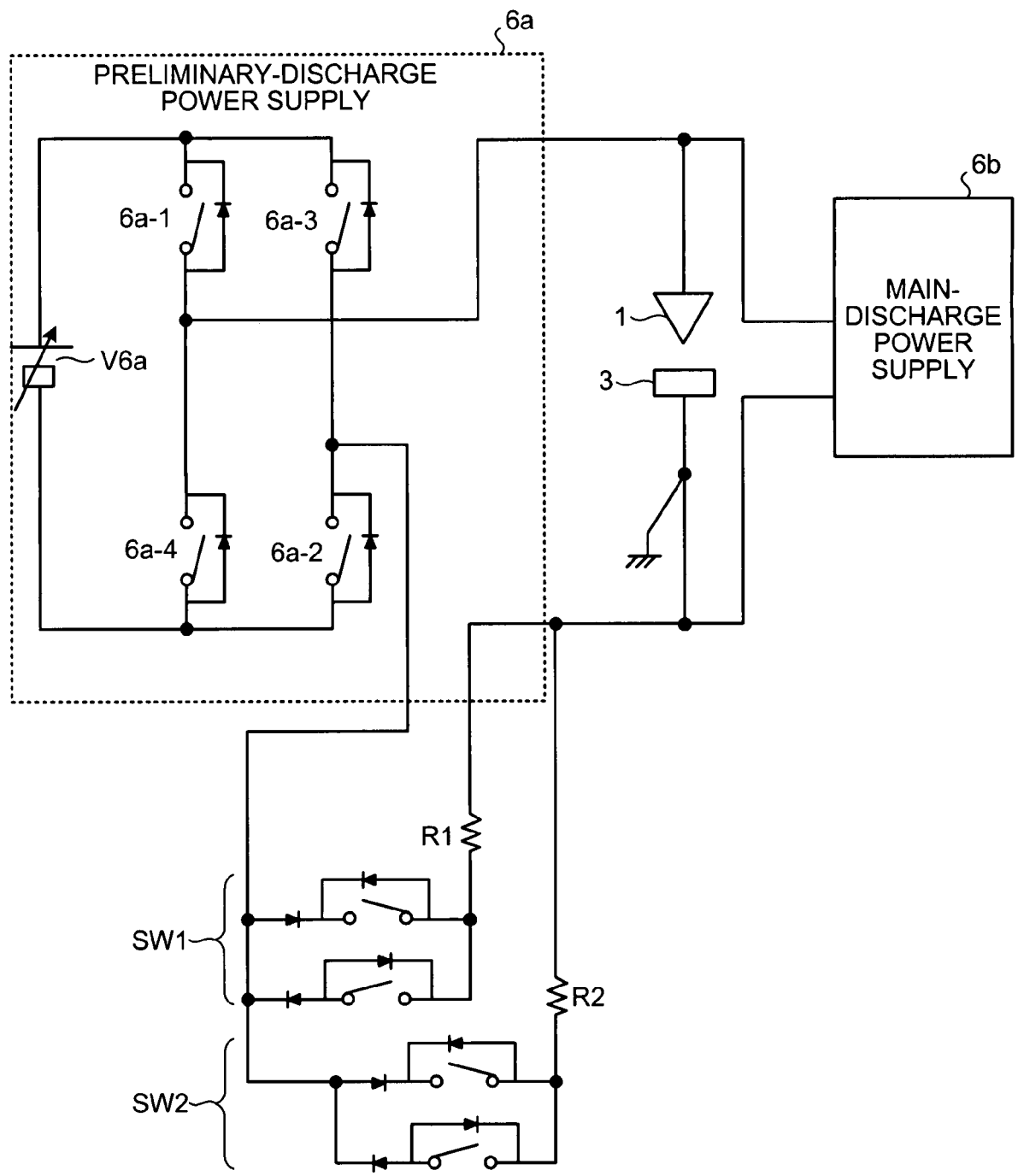
FIG. 11 is a circuit diagram of an example of a circuit that adjusts machining energy under the finish machining conditions.

Thus, the machining energy is adjusted by changing a voltage of the preliminary-discharge power supply 6a or changing a resistance of a resistor provided between the preliminary-discharge power supply 6a and between the electrodes. A circuit configuration in this case is shown in FIG. 11. FIG. 11 is a circuit diagram of an example of a circuit that adjusts machining energy under the finish machining conditions.

In FIG. 11, a plurality of series circuits of bidirectional switches SW and current limiting resistors R (in FIG. 11, two series circuits, namely, a series circuit of a bidirectional switch SW1 and a current limiting resistor R1 and a series circuit of a bidirectional switch SW2 and a current limiting resistor 2R) are connected in parallel between the preliminary-discharge power supply 6a and the work 3. The current limiting resistor R has, for example, 1 kilohm and the current limiting resistor R2 has, for example, 2 kilohms.

When it is desired to set a large machining amount, the current limiting resistors R1 and R2 are actuated in parallel to form a current limiting resistor having 0.67 kilohm and feed a finish machining current between the electrodes. When it is desired to set a small machining amount, for example, only the current limiting resistor R2 is actuated to form a current limiting resistor having 2 kilohms and feed a machining current between the electrodes. Consequently, it is possible to adjust machining energy in the same manner as adjustment of a power supply voltage and perform shape correction in the third and the subsequent cuts. In this case, naturally, even in such a faint machining current region, it is possible to determine discharge positions based on signals of the current sensors 13a and 13b.

When predicted discharge positions and actual discharge positions are substantially different, the next electric discharge may be determined based on continuous discharge positions to perform adjustment of machining energy. For example, as explained with reference to FIG. 10, a high frequency current continuously flows under the finish machining conditions. Electric discharges are continuous in some cases. It may be considered that the electric discharges occur in a substantially identical place. Therefore, if it is considered that the next discharge position is substantially the same based on the preceding discharge position, it is possible to determine a necessary machining amount in that position from contents held by the shape recognizing/correcting circuit 16 and the control device 11 and adjust the machining energy.

As described above, in the idea of the shape correction according to the first to the fourth embodiments, machining energy is monitored to perform adjustment of the machining energy. Thus, for example, when electric discharges continue in an identical machining area, if a reduction in machining energy such as a reduction in a current pulse width, a reduction in a peak current, or a reduction in a charge quantity, which is an integral value of machining currents, is confirmed, it may be said that this is a machining form conforming to the present invention.

A difference between, for example, the Patent Document 1 and the present invention is explained. When improvement of straightness accuracy is realized based on the present invention, the shape recognizing/correcting circuit 16 operates to correct irregularity of a machining amount caused by a bias of machining energy. On the other hand, an object in the conventional wire electric discharge machining apparatus that uses a discharge position detector represented by the Patent Document 1 is detection of a concentrated discharge and prevention (control) of the concentrated discharge. Since the concentrated discharge is a bias of machining energy, both the present invention and the conventional example can be perceived as a technology for detecting and controlling a bias of machining energy. However, since there is a conceptual difference between the present invention and the conventional example, operations thereof are substantially different.

The detection of a concentrated discharge in the conventional example concerns electric discharges that temporally continue in an identical position. A range that can be regarded as the identical position in the conventional example is, in this case, a range of a magnitude (e.g., an arc column) of one electric discharge. The range may be considered a range of about several tens micrometers to several hundred micrometers at most (Non-Patent Literature 1). A temporal range is a range of about 2 microseconds to 3 microseconds at most (Non-Patent Literature 2). On the other hand, the shape correction disclosed in the present invention is shape correction for observing, in several hundred milliseconds to several seconds, a bias of machining energy in a range of several millimeters to twenty millimeters with respect to the Z-axis direction and processing the bias. In other words, the detection of a concentrated discharge in the present invention concerns an area in which the concentrated discharge in the Non-Patent Literature 2 is not observed any more.

Strictly speaking, time for counting a bias of machining energy should be calculated from machining speed in a wire traveling direction and accuracy in the X (Y) coordinate. For example, it is assumed that a work having board thickness of 60 millimeters is machined under a condition of 300 mm$^2$/min using a wire electrode having a diameter of 0.3 millimeter. In this case, if a discharge gap is about 100 micrometers and wire oscillation is about ±100 micrometers, a count of accumulated energy is set to about 100 micrometers with respect to the wire traveling direction at most. Since the wire electrode travels at 5 mm/min in the traveling direction, the wire electrode travels 100 micrometers in 1.2 seconds. The accumulated energy only has to be calculated in time of this order to perform shape recognition. Even if shape correction is performed at high accuracy of 10 micrometers, 120 milliseconds are required as a machining time. Thus, it is seen that this is different from the control of a so-called concentrated discharge in the Non-Patent Literature 2.

Specifically, for example, in the concentration detecting circuit disclosed in the Patent Document 1, when a work having thickness equal to or smaller than several hundred micrometers is machined, during several to several hundred electric discharges from the start, it is determined that a concentrated discharge has occurred to reduce machining energy. On the other hand, in the shape recognizing/correcting circuit 16 disclosed in the present invention, when a work having thickness equal to or larger than several millimeters is machined, during several hundred to several tens thousand electric discharges from the start, excessive energy is recognized to reduce machining energy. On the contrary, under the identical work conditions, even in a state of distributed electric discharges in which the concentration detecting circuit does not react at all, if excessive machining energy is present statistically, the shape recognizing/correcting circuit 16 can operate and perform adjustment of the machining energy.

Fifth Embodiment

Figure 12:
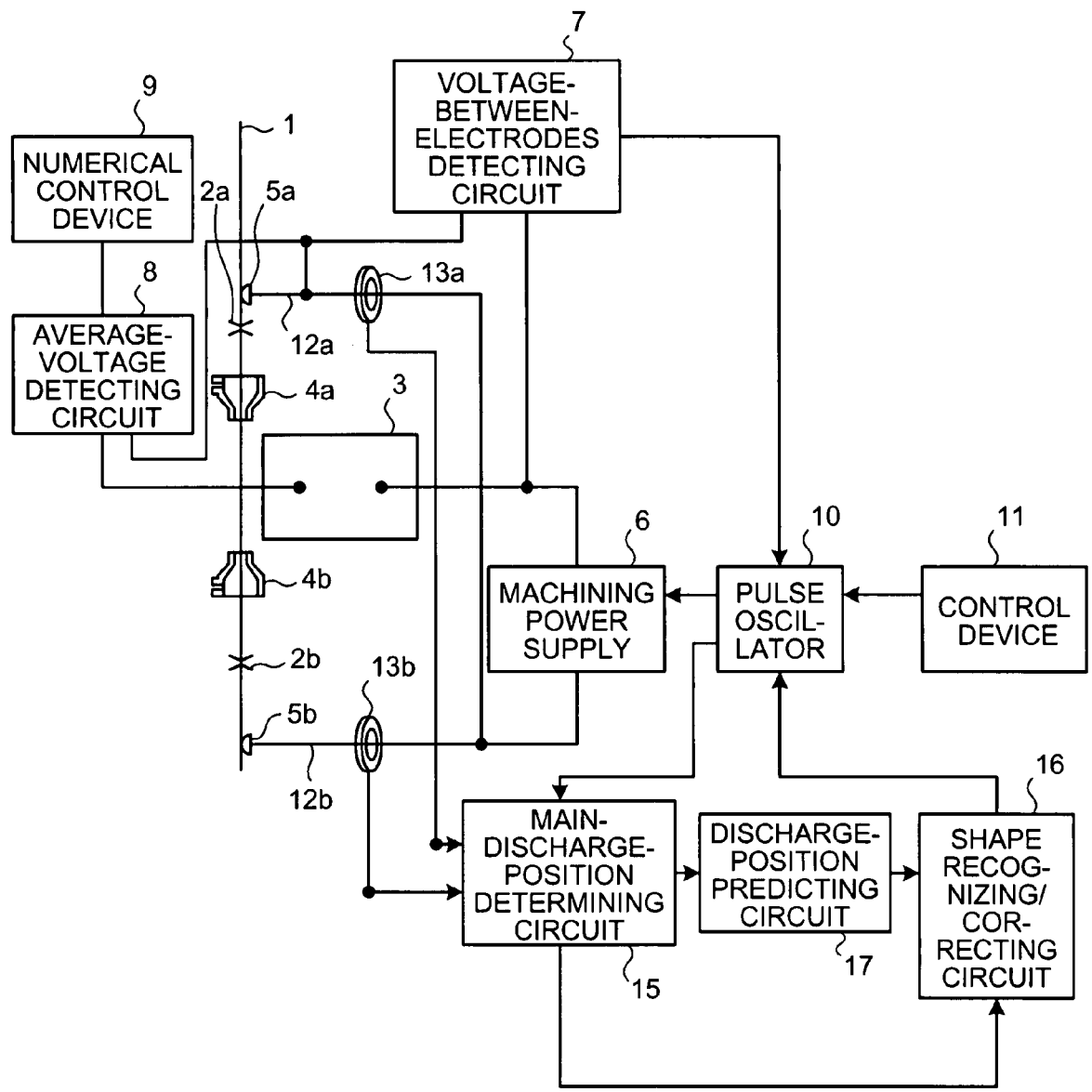
FIG. 12 is a block diagram of a structure of a wire electric discharge machining apparatus according to a fifth embodiment of the present invention.

FIG. 12 is a block diagram of a structure of a wire electric discharge machining apparatus according to a fifth embodiment of the present invention. In the fifth embodiment, machining energy adjustment based on main-discharge position prediction rather than discharge position determination according to a preliminary discharge current is explained. In FIG. 12, in the structure shown in FIG. 1 (described according to the first embodiment), the preliminary-discharge-position determining circuit 14 is not provided and a discharge-position predicting circuit 17 is provided between the main-discharge-position determining circuit 15 and the shape recognizing/correcting circuit 16. The significance of provision of the discharge-position predicting circuit 17 is explained with reference to FIG. 13.

FIG. 13 is a graph of a discharge position obtained from the main-discharge-position determining circuit shown in FIG. 12 and a state at the time when the next discharge position is predicted based on the discharge position. In FIG. 13, an abscissa indicates a processing time and an ordinate indicates a work coordinate (a discharge position). Experiment data shown in FIG. 13($a$) is obtained by plotting discharge positions obtained from the main-discharge-position determining circuit 15 using a work having board thickness of 60 millimeters.

There is wire oscillation as a cause of deterioration in straightness as described above. Oscillation has certain regularity and, therefore, discharge positions also have some regularity. It is seen from the experiment data shown in FIG. 13($a$) that discharge positions continuously shift from up to down and from down to up and electric discharges are not merely performed in a disorderly manner. A cycle in that case is about 300 microseconds (a frequency of 3.3 kilohertz).

Prediction data shown in FIG. 13(b) is obtained by calculating prediction points based on this experiment data and plotting the prediction points. There is high coincidence between the discharge positions and the prediction points. A predictive calculation in this case is a calculation for simply calculating a moving distance from a discharge position of N(−1) and a discharge position of N(0) and adding the moving distance to N(0) to obtain a discharge position of N(+1). When a result of the calculation is equal to or larger than +30 or equal to or smaller than −30, the discharge position is returned. Even in a simple system in which the temporal idea is completely omitted in this way, it is possible to predict discharge positions to some extent. It is possible to consider that this is because electric discharges occurred uniformly in terms of time under these observation conditions.

In this case, when electric discharges are non-uniform with respect to a time axis, time correction is required. Moving speed from N(−1) to N(0) is obtained by a discharge interval from time of N(−1) and time of N(0) simultaneously with the calculation of a moving distance from the discharge position of N(−1) and the discharge position of N(0). At an instance of detection of an electric discharge of N(+1), a moving distance from N(0) is calculated from the moving speed and a position of N(+1) is estimated.

In short, in the structure shown in FIG. 12, the main-discharge-position determining circuit 15 performs confirmation of a discharge position. The discharge-position predicting circuit 17 predicts the next discharge position from a discharge position calculated in the course of the confirmation according to the algorithm and sends information on the position predicted to the shape recognizing/correcting circuit 16. The shape recognizing/correcting circuit 16 issues a command to the pulse oscillator 10 in an attempt to realize target machining energy in the predicted position obtained in this way. The oscillator 10 sends a control signal to the machining power supply 6 and performs machining. The main-discharge-position determining circuit 15 measures an actual discharge current fed by a machining voltage of the machining power supply 6, sends a signal to the discharge-position predicting circuit 17 to predict the next electric discharge, and, at the same time, sends an actual discharge position to the shape recognizing/correcting circuit 16 to calculate machining energy. It is possible to obtain the effect in improvement of straightness as according to the first embodiment by inputting input machining energy calculated in advance to this predicted position in this way.

As described above, according to the fifth embodiment, since a method of predicting discharge positions using the main-discharge-position determination is used, the discharge position determination by the preliminary-discharge-position determining circuit 14 is unnecessary. Therefore, since it is unnecessary to perform a calculation in a short time from the preliminary-discharge-position determination to the input of the main discharge current, high-speed components are unnecessary. It is possible to realize the shape recognizing/correcting circuit with a relatively simple and inexpensive structure.

Sixth Embodiment

One of main points of the present invention is to search for discharge positions before the main discharge current is applied. According to the first embodiment, discharge positions are calculated using the preliminary discharge current. In the fifth embodiment, the next discharge position is predicted according to the discharge position prediction using the main-discharge-position determination. In a sixth embodiment of the present invention, as other methods of calculating discharge positions, an example of discharge position measurement using a pulse (which is called "dummy pulse") other than a preliminary discharge pulse immediately preceding a main-discharge current pulse is described. For example, in the case of underwater discharge machining, it is known that, to prevent electrolytic corrosion, an alternating current pulse is applied before application of a preliminary discharge pulse to control an average voltage between the electrodes to be substantially 0 volt. This pulse applied irrespective of machining is used for position measurement as a dummy pulse in the sixth embodiment.

The problem of the preliminary-discharge position determination explained according to the first embodiment is speed from occurrence of a preliminary discharge to position determination, shape recognition, and machining energy adjustment (output of an application stop signal). Therefore, it is explained that it is desirable to use the extended discharge circuit or the like if necessary (the third embodiment). On the other hand, the dummy pulse described in the sixth embodiment uses a discharge position in a pulse before the preliminary discharge pulse is applied. Thus, there is relatively a temporal margin. As explained in the fourth embodiment, there is regularity in discharge positions and electric discharges close to each other temporally are also close to each other spatially. It is possible to consider that discharge positions in the dummy pulse and discharge positions in the main discharge current are substantially equal.

Figure 14:
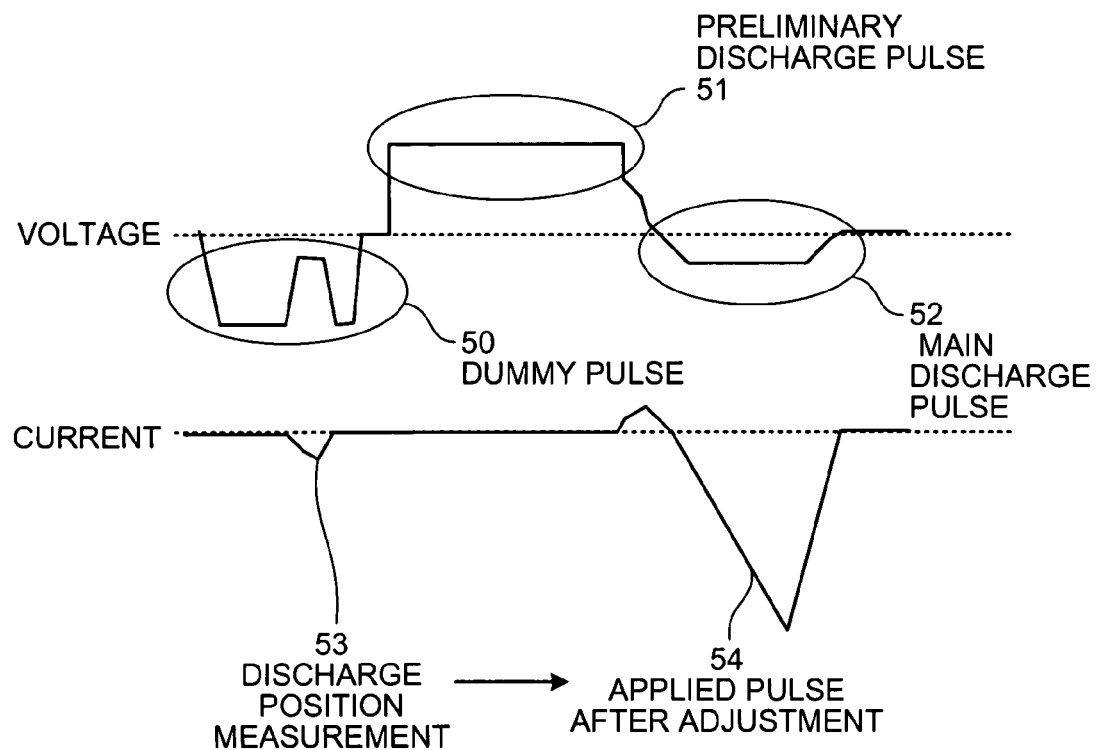
FIG. 14 is a waveform chart for explaining operations of a wire electric discharge machining apparatus according to a sixth embodiment of the present invention.

The sixth embodiment is explained using the structure of the wire electric discharge machining apparatus shown in FIG. 1 (described according to the first embodiment). It is possible to use the structure of the wire electric discharge machining apparatus by reading the preliminary-discharge-position determining circuit 14 in the structure as a dummy-pulse-position determining circuit. FIG. 14 is a waveform chart for explaining operations of a wire electric discharge machining apparatus according to the sixth embodiment of the present invention.

In FIG. 14, the dummy pulse 50 is originally a pulse for controlling an average current between the electrodes to be 0 volt as described above and does not contribute to machining. An electric discharge in a discharge position is detected and discharge position measurement 53 is performed in the dummy-pulse-position determining circuit 14. Time until the next application of a preliminary-discharge voltage pulse 51, discharge detection, and application of a main-discharge voltage pulse 52 is relatively long, several microseconds to several tens microseconds. During this time, the shape recognizing/correcting circuit 16 determines optimum machining energy in this discharge position. The pulse oscillator 10 controls the main-discharge power supply 6b to output the main-discharge voltage pulse 52 such that a main-discharge current pulse 54 with a necessary pulse width flows. In actual discharge position measurement, the main-discharge position determining circuit 15 only has to be used as according to the first embodiment.

By adopting such a constitution, the discharge-position determining circuits 14 and 15 and the shape recognizing/correcting circuit 16 do not have to be designed according to high-speed specifications. It is possible to perform shape correction for improving straightness accuracy with a relatively simple structure of the circuits. In FIG. 14, a pulse of a polarity opposite to that of the preliminary discharge pulse is used as the dummy pulse. However, there is no limitation about a polarity of the dummy pulse.

Seventh Embodiment

Figure 15:
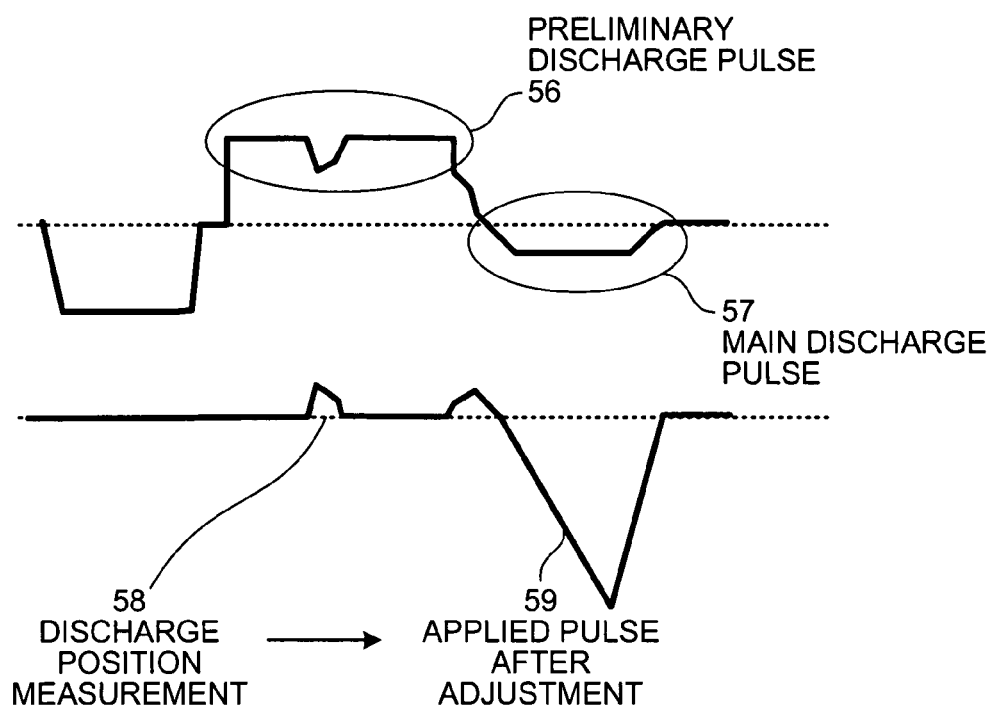
FIG. 15 is a waveform chart for explaining operations of a wire electric discharge machining apparatus according to a seventh embodiment of the present invention.

FIG. 15 is a waveform chart for explaining operations of a wire electric discharge machining apparatus according to a seventh embodiment of the present invention. In the seventh embodiment, a method of obtaining actions and effects equivalent to those in the sixth embodiment, in which a dummy pulse is used, using a preliminary-discharge voltage pulse instead of the dummy pulse is explained.

In FIG. 15, a preliminary-discharge voltage pulse 56 indicates that two preliminary-discharge voltage pulses are applied. Even if a preliminary discharge is detected for the first time, a main-discharge voltage pulse 57 is not applied. When a preliminary discharge is detected for the second time, discharge position measurement 58 is performed to actuate the wire electric discharge machining apparatus to apply the main-discharge voltage pulse 57 such that a main-discharge current pulse 59 with a necessary pulse width flows. According to such a system, it is also possible to obtain effects similar to those obtained when the dummy pulse is used.

As explained in the conventional example, usually, it is impossible to adjust a discharge state in the Z-axis direction (the wire traveling direction) in the wire electric discharge machining apparatus. The discharge state is adjusted with respect to the wire traveling direction at most. In that case, an electric condition (a machining state) is uniform in the Z-axis direction. On the other hand, as explained in the respective embodiments, since machining energy is adjusted simultaneously with the detection (or measurement) of discharge positions, it is possible to change the electric condition in the Z-axis direction. In the first to the seventh embodiments, the method used for improvement of straightness accuracy has been mainly described. However, the present invention is not limited to this method.

In eighth to tenth embodiments described below, examples of machining (first to third examples) in which the methods described in the first to the seventh embodiments explained above are used are explained.

Eighth Embodiment

Figure 16:
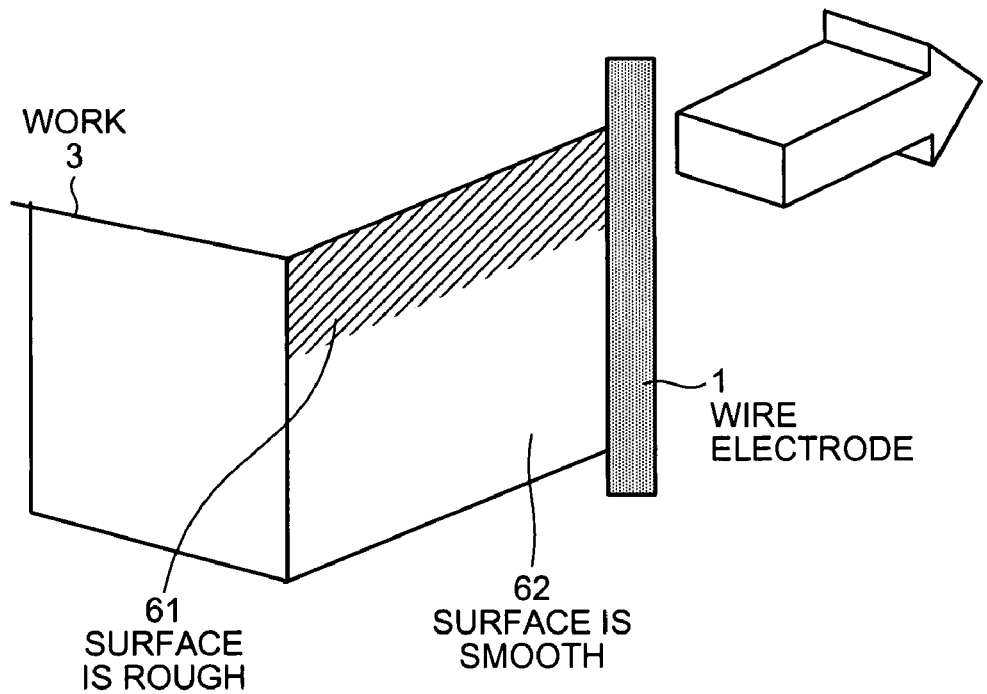
FIG. 16 is a conceptual diagram for explaining, as an eighth embodiment of the present invention, an example of machining in which a different machining method is carried out depending on a place of a work.

FIG. 16 is a conceptual diagram for explaining, as an eighth embodiment of the present invention, an example of machining for carrying out a machining method that varies depending on a place of a work. In the present invention, as shown in FIG. 16, it is possible to set surface roughness high only in a portion 61 (in FIG. 16, a surface on an upper side) of the work 3 and set surface roughness low in another portion 62 (in FIG. 16, a surface on a lower side).

It is known that there is a correlation between surface roughness and discharge energy per one electric discharge. By using the correlation, the portion 61 where it is desired to roughen the surface is set to have a large discharge quantity and the portion 62 where it is desired to smooth the surface is set to have a small charge quantity. New applications are prospective in fitting components and the like by changing a part of surface roughness in this way.

Such machining is not limited to the first cut. It is also possible to apply the machining to chambering in the second and the subsequent cuts. It is also possible to differentiate surface roughness by performing usual machining in the first cut and selectively finishing only the surface on the lower side in FIG. 16 in the second cut.

Ninth Embodiment

Figure 17:
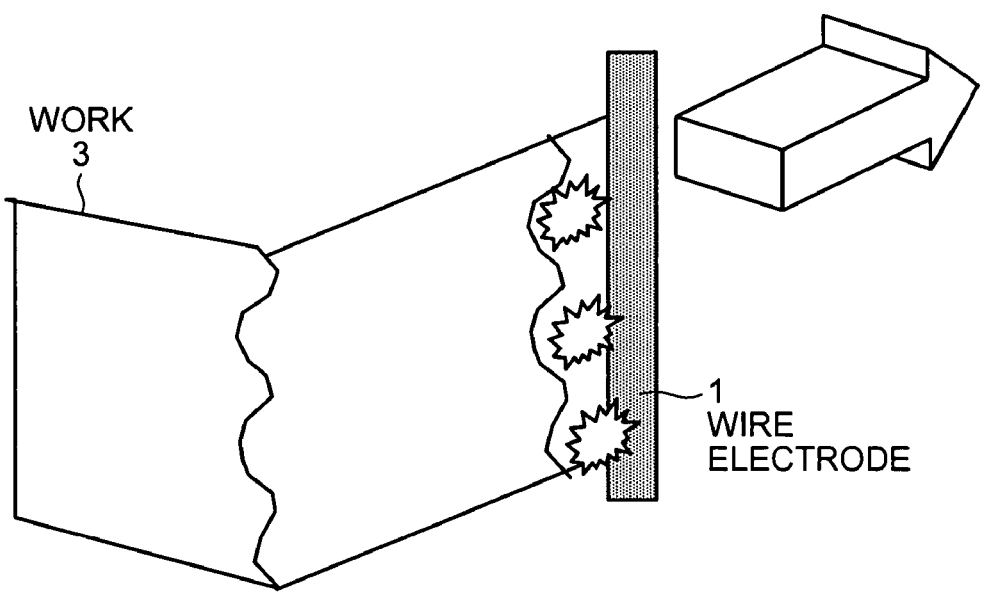
FIG. 17 is a conceptual diagram for explaining, as a ninth embodiment of the present invention, an example of machining at the time when only a part of a work is machined.

FIG. 17 is a conceptual diagram for explaining, as a ninth embodiment of the present invention, an example of machining in machining only a part of a work. In the present invention, as shown in FIG. 17, it is possible to machine only a portion of a work. In particular, it is also possible to dig and machine only a specific place in chamfering. An upper limit of digging depth is an area where machining of portions other than a machining portion is hindered by a short circuit. For example, it is considered possible to perform digging to a degree of about 0.01 time to five times of a diameter of the wire electrode 1 by relaxing wire tension.

For accurate machining, it is an essential condition to set tension of the wire electrode 1 strong to some degree to improve accuracy. However, if the technology of the present invention is used, there is no limit in the setting of wire tension. In general, wire strength is proportional to a wire sectional area and inversely proportional to wire tension. Thus, it is also possible to realize an increase in speed of machining because wire yield strength is increased and machining energy is further intensified by relaxing the wire tension.

Tenth Embodiment

Figure 18:
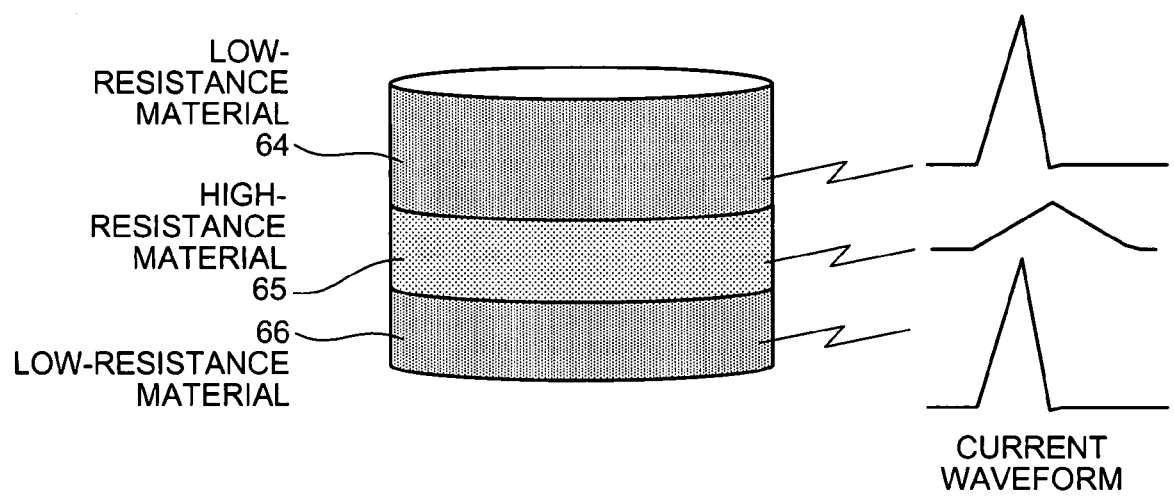
FIG. 18 is a conceptual diagram for explaining, as a tenth embodiment of the present invention, an example of machining at the time when a plurality of works made of different materials are stacked and simultaneously machined.

FIG. 18 is a conceptual diagram for explaining, as a tenth embodiment of the present invention, an example of machining in stacking a plurality of works made of different materials and machining the works simultaneously. In the present invention, when a plurality of works made of different materials are stacked, it is possible to machine the works simultaneously. In the example shown in FIG. 18, a high-resistance material 65 is placed between low-resistance materials 64 and 66.

In machining of a hard machining material such as the high-resistance material 65, for example, a current waveform having a long pulse and a low peak may be an optimum machining condition. In the usual low-resistance materials 64 and 66, conversely, a current waveform having a short pulse and a high peak is desirable. When a complex material shown in FIG. 18 obtained by stacking these materials is machined, conventionally, both the materials have to be machined according to conditions of any one of the materials or machined in a state deviating from optimum conditions.

On the other hand, in the present invention, even in the complex material shown in FIG. 18, if boundaries of board thicknesses thereof, that is, the materials are grasped in advance, or if board thicknesses of the respective works and current waveforms applied to the works are prepared in the storing device included in the control device 11 in advance at the time of condition setting before machining, it is possible to determine which material is currently machined by comparing boundary positions of the materials and discharge positions (positions on the Z-axis in the vertical direction in the figure) using the method explained in the first to the seventh embodiments. When it is determined that the material currently machined is in a discharge position for machining the high-resistance material 65, a current waveform having a long pulse and a low peak is applied from the machining power supply 6 to machine the high-resistance material 65. When it is determined that the material currently machined is in discharge positions for machining the low-resistance materials 64 and 66, a current waveform having a short pulse and a high peak is applied from the machining power supply 6 to machine the low-resistance materials 64 and 66. By performing such machining, in stacking a plurality of different materials and machining the materials simultaneously, it is possible to select current waveforms suitable for the respective materials and apply the current waveforms. Thus, it is possible to perform high-speed and high-quality machining. It is possible to realize shape formation of the current waveforms according to, for example, a method of changing operation of a power supply voltage or the number of FETs operating in parallel.

Eleventh Embodiment

According to an eleventh embodiment of the present invention, concerning a method of performing a concentrated discharge detection/prevention technology with higher performance, a difference of predominance between the present invention and the conventional example is explained. The concentrated discharge detection in the conventional example is a method of measuring discharge positions using a main discharge current such as the method disclosed in the Patent Document 1. The concentrated discharge detection is not based on the idea of specifying discharge positions before main machining current application. Therefore, a concentrated-discharge detecting circuit is a circuit that takes, when plural times of electric discharges have continuously occurred in substantially identical portions, concentration prevention measures or breaking wire prevention measures such as an increase in feeding speed of a wire electrode, weakening of wire tension, reduction of machining energy, and extension of a discharge pause period. When the concentrated-discharge detecting circuit detects concentrated discharges at least twice, the concentrated-discharge detecting circuit performs discharge control for concentrated discharges of a third and subsequent times.

On the other hand, in the present invention, since it is possible to determine discharge positions before main machining current application, it is possible to determine at that point whether an electric discharge is a concentrated discharge. Discharge positions may be measured using a preliminary-discharge voltage pulse as described according to the first embodiment or may be measured using a dummy pulse as described in the sixth embodiment. Even when discharge positions are predicted as described in the fifth embodiment, it is also possible to predict a concentrated discharge by grasping a sign indicating that a rate of change of discharge positions decreases.

In any case, in the present invention, it is determined whether an electric discharge is a concentrated discharge before application of a main-discharge voltage pulse. When it is determined that the electric discharge is a concentrated discharge, that is, an electric discharge to an identical portion, it is possible to reduce machining energy from an input amount initially planned. Thus, it is possible to prevent breaking of wire and improve productivity.

As described above, in the wire electric discharge machining apparatus according to the present invention, discharge position detection is performed using a preliminary discharge current to adjust energy of a main discharge current applied following the preliminary discharge current. A shape determining circuit is provided in the circuit, an energy amount of the main discharge current is accumulated together with discharge position information, and an optimum main-discharge energy amount in that discharge portion is calculated. When a discharge position is determined using the preliminary discharge current, the power supply circuit is actuated by the optimum main-discharge energy amount in the position information from the shape determining circuit.

It is conceivable that the discharge position shifts with certain-regularity mainly because of wire oscillation. Thus, a position where an electric discharge occurs next is estimated utilizing this regularity. Specifically, the discharge-position predicting circuit is provided to predict the next position and perform machining by an energy amount calculated by the shape determining circuit. At the same time, a true discharge position is measured using the main discharge current to correct a calculation process of the discharge-position predicting circuit.

In realizing an application to the concentrated discharge detecting circuit, the discharge-position determining unit that uses the preliminary discharge current is used. When it is determined that the discharge position is identical with the last (preceding) discharge position, energy of the main discharge current is reduced or the application itself of the main discharge current is stopped to prevent breaking of wire due to the concentrated discharge.

In stacking a plurality of works made of different materials and processing the works, board thicknesses of the respective works and current waveforms applied thereto are programmed and prepared in a storing device in advance at the time of condition setting before machining. The materials of the works are determined in association with the discharge position determination according to the preliminary discharge current and the discharge-position predicting circuit to machine the works under optimum machining conditions, respectively.

In this way, according to the present invention, since it is possible to reduce machining energy for each machining position as required, it is possible to improve straightness accuracy. Further, it is possible to more positively perform machining of an arbitrary shape in the traveling direction (the Z-axis direction) of the wire.

If the discharge-position predicting circuit is used, it is possible to predict discharge positions during time from the end of a main discharge current to application of the next main discharge current and perform selection of necessary machining energy. Thus, it is unnecessary to select circuit components that are higher in speed more than necessary. It is possible to design the circuit with a relatively inexpensive circuit configuration.

Moreover, if the determination of a concentrated discharge is performed using a preliminary discharge current, it is possible to determine that an electric discharge is a concentrated discharge before a main discharge current in a second electric discharge is applied and reduce machining energy based on the determination. This makes it possible to prevent breaking of wire. Alternatively, since it is possible to increase maximum machining speed until the wire breaks, it is possible to improve productivity.

Furthermore, even when a plurality of works made of different materials are stacked, it is possible to determine a material corresponding to a discharge position before application of a main discharge current by setting a corresponding relation between coordinates in the Z-axis direction and the respective materials (works) to a known state. It is possible to select optimum machining conditions based on the determination. This makes it possible to perform simultaneous machining. In other words, even when a plurality of works made of different materials are stacked, it is possible to increase machining speed and improve productivity.

INDUSTRIAL APPLICABILITY

As described above, the wire electric discharge machining apparatus and the wire electric discharge machining method according to the present invention are useful for realizing improvement of straightness, preventing breaking of wire due to a concentrated discharge that occurs twice in a row, and improving productivity without reducing machining speed even when a plurality of works made of different materials are stacked.

The invention claimed is:

1. A wire electric discharge machining apparatus comprising:
   a discharge-generation control unit that applies at least a preliminary-discharge voltage pulse and a main-discharge voltage pulse between a wire electrode and a work in sequence to generate a pulse electric discharge;
   a plurality of current measuring units that measure discharge currents flowing between the electrodes in a plurality of current-carrying paths;
   a discharge-position determining unit that determines, when calculating discharge positions from results of measurement by the current measuring units, a discharge position at the time of at least second application of the preliminary-discharge voltage pulse; and
   a machining-energy adjusting unit that sets one of the discharge position calculated by the discharge-position determining unit at the time of the application of the preliminary-discharge voltage pulse, a discharge position predicted from a discharge position, where an electric discharge occurred in the past, calculated from the main-discharge voltage pulse immediately preceding the preliminary-discharge voltage pulse, and a discharge position calculated by the discharge-position determining unit at the time of application of a voltage pulse generated before the application of the preliminary-discharge voltage pulse as a discharge position determined before the application of the main-discharge voltage pulse, compares, as required, the discharge position determined before the application of the main-discharge voltage pulse and the discharge position calculated by the discharge-position determining unit at the time of the application of the main-discharge voltage pulse and reflects a result of the comparison on determination of a discharge position performed before application of the main-discharge voltage pulse performed next time, adjusts a pulse width or a voltage of the main-discharge voltage pulse, and feeds a result of the adjustment to the discharge-generation control unit to cause the discharge-generation control unit to reflect the result on the generation of an electric discharge.

2. The wire electric discharge machining apparatus according to claim 1, wherein
   the machining-energy adjusting unit sets one of the discharge position calculated by the discharge-position determining unit at the time of the application of the preliminary-discharge voltage pulse, the discharge position predicted from a discharge position, where an electric discharge occurred in the past, calculated from the main-discharge voltage pulse immediately preceding the preliminary-discharge voltage pulse, and the discharge position calculated by the discharge-position determining unit at the time of application of a voltage pulse generated before the application of the preliminary-discharge voltage pulse as a discharge position determined before the application of the main-discharge voltage pulse, compares, as required, the discharge position determined before the application of the main-discharge voltage pulse and the discharge position calculated by the discharge-position determining unit at the time of the application of the main-discharge voltage pulse and reflects a result of the comparison on determination of a discharge position performed before application of the main-discharge voltage pulse performed next time, when the discharge position determined substantially coincides with the discharge position determined last time, adjusts machining energy generated by the main-discharge voltage pulse applied this time to be smaller than initially planned machining energy by adjusting a pulse width or a voltage of the main-discharge voltage pulse, and gives a result of the adjustment to the discharge-generation control unit to cause the discharge-generation control unit to reflect the result on the generation of an electric discharge.

3. The wire electric discharge machining apparatus according to claim 1, wherein
   when the work is formed by stacking a plurality of materials of different qualities, the machining-energy adjusting unit sets one of the discharge position calculated by the discharge-position determining unit at the time of the application of the preliminary-discharge voltage pulse, the discharge position predicted from a discharge position, where an electric discharge occurred in the past, calculated from the main-discharge voltage pulse immediately preceding the preliminary-discharge voltage pulse, and the discharge position calculated by the discharge-position determining unit at the time of application of a voltage pulse generated before the application of the preliminary-discharge voltage pulse as a discharge position determined before the application of the main-discharge voltage pulse, compares, as required, the discharge position determined before the application of the main-discharge voltage pulse and the discharge position calculated by the discharge-position determining unit at the time of the application of the main-discharge voltage pulse and reflects a result of the comparison on determination of a discharge position performed before application of the main-discharge voltage pulse performed next time, determines, for each of the materials of the work, a waveform of the main-discharge voltage pulse applied to the discharge position determined, and gives a result of the determination to the discharge-generation control unit to cause the discharge-generation control unit to reflect the result on the generation of an electric discharge.

4. The wire electric discharge machining apparatus according to claim 1, wherein
   the machining-energy adjusting unit performs the adjustment of the pulse width of the main-discharge voltage pulse by giving a main-discharge voltage-pulse stop signal to the discharge-generation control unit that has output the main-discharge voltage pulse.

5. The wire electric discharge machining apparatus according to claim 1, wherein
   the machining-energy adjusting unit controls a discharge frequency and adjusts machining energy according to adjustment of an application time interval for the main-discharge voltage pulse including adjustment of a pause period in which the preliminary-discharge voltage pulse and the main-discharge voltage pulse are not applied.

6. The wire electric discharge machining apparatus according to claim 1, wherein
   the discharge-generation control unit includes, as a mechanism for delaying an application time of the main-discharge voltage pulse by maintaining an electric discharge of a same polarity even after an electric discharge by the preliminary-discharge voltage pulse, an extended discharge circuit that applies an extended-discharge voltage pulse, which has the same polarity as the preliminary-discharge voltage pulse and a predetermined pulse width, between the preliminary-discharge voltage pulse and the main-discharge voltage pulse.

7. The wire electric discharge machining apparatus according to claim 1, wherein
the discharge-generation control unit includes, as a mechanism for delaying an application time of the main-discharge voltage pulse by maintaining an electric discharge of an opposite polarity even after an electric discharge by the preliminary-discharge voltage pulse, an extended discharge circuit that supplies a discharge current of the opposite polarity between the electrodes for a predetermined time following a discharge current generated by the preliminary-discharge voltage pulse.

8. A wire electric discharge machining apparatus comprising:
a discharge-generation control unit that applies at least a preliminary-discharge voltage pulse and a main-discharge voltage pulse between a wire electrode and a work in sequence to generate a pulse electric discharge;
a plurality of current measuring units that measure discharge currents flowing between the electrodes in a plurality of current-carrying paths;
a discharge-position determining unit that calculates a discharge position from results of measurement by the current measuring units;
a shape predicting unit that accumulates, at the time of at least first cut of the first cut and second cut, for each discharge position on a Z coordinate calculated by the discharge-position determining unit at the time of one or both of the preliminary-discharge voltage pulse and the main-discharge voltage pulse, machining energy on X and Y coordinates generated by the main-discharge voltage pulse applied to the discharge position and predicts a present machining shape based on the accumulated machining energy in the X and Y coordinates; and
a machining-energy adjusting unit that adjusts, at the time of the second and subsequent cuts or, when the second cut time is included in objects of the shape predicting unit, at the time of third and subsequent cuts, machining energy generated by the preliminary-discharge voltage pulse input according to the machining shape predicted by the shape predicting unit and feeds a result of the adjustment to the discharge-generation control unit which generates an electric discharge based on the result of the adjustment.

9. The wire electric discharge machining apparatus according to claim 8, wherein
the machining-energy adjusting unit adjusts an output voltage of a preliminary-discharge power supply that outputs the preliminary-discharge voltage pulse.

10. The wire electric discharge machining apparatus according to claim 8, wherein
the machining-energy adjusting unit adjusts a resistance of a resistor provided between a preliminary-discharge power supply, which outputs the preliminary-discharge voltage pulse, and between the electrodes.

11. A wire electric discharge machining method for a wire electric discharge machining apparatus including a discharge-generation control unit that applies at least a preliminary-discharge voltage pulse and a main-discharge voltage pulse between a wire electrode and a work in sequence to generate a pulse-like electric discharge, a plurality of current measuring units that measure discharge currents flowing between the electrodes in a plurality of current-carrying paths, and a discharge-position determining unit that calculates a discharge position from results of measurement by the current measuring units, the wire electric discharge machining method comprising:

setting, when the work is formed by stacking a plurality of materials of different qualities, boundary position coordinates of the respective materials and current waveforms applied to the materials in a storing unit;
determining a discharge position before the application of the main-discharge voltage pulse;
determining, with reference to the storing unit, a waveform of the main-discharge voltage pulse applied to the discharge position determined for each of the materials of the work; and
generating, by the discharge-generation control unit an electric discharge based on the determined waveform.

12. The wire electric discharge machining method according to claim 11, wherein
the discharge position determined before the application of the main-discharge voltage pulse is a discharge position calculated by the discharge-position determining unit at the time of the application of the preliminary-discharge voltage pulse, the discharge position being obtained by comparing, as required, a discharge position determined before the application of the main-discharge voltage pulse and a discharge position calculated by the discharge-position determining unit at the time of the application of the main-discharge voltage pulse and determining a discharge position before application of the main-discharge voltage pulse performed next time based on the result of the comparing of the discharge position determined before the application of the main-discharge voltage pulse and the discharge position calculated by the discharge-position determining unit at the time of the application of the main-discharge voltage pulse.

13. The wire electric discharge machining method according to claim 11, wherein
the discharge position determined before the application of the main-discharge voltage pulse is a discharge position predicted from a discharge position, where an electric discharge occurred in the past, calculated from the main-discharge voltage pulse immediately preceding the preliminary-discharge voltage pulse, the discharge position being obtained by comparing, as required, a discharge position determined before the application of the main-discharge voltage pulse and a discharge position calculated by the discharge-position determining unit at the time of the application of the main-discharge voltage pulse and reflecting a result of the comparison on determination of a discharge position performed before application of the main-discharge voltage pulse performed next time.

14. The wire electric discharge machining method according to claim 11, wherein
the discharge position determined before the application of the main-discharge voltage pulse is a discharge position calculated by the discharge-position determining unit at the time of application of a voltage pulse generated before the application of the preliminary-discharge voltage pulse, the discharge position being obtained by comparing, as required, a discharge position determined before the application of the main-discharge voltage pulse and a discharge position calculated by the discharge-position determining unit at the time of the application of the main-discharge voltage pulse and reflecting a result of the comparison on determination of a discharge position performed before application of the main-discharge voltage pulse performed next time.

* * * * *